(12) United States Patent
Hunter et al.

(10) Patent No.: US 7,960,005 B2
(45) Date of Patent: Jun. 14, 2011

(54) BROADCAST DISTRIBUTION OF CONTENT FOR STORAGE ON HARDWARE PROTECTED OPTICAL STORAGE MEDIA

(75) Inventors: Charles Eric Hunter, Hilton Head, SC (US); Bernard L Ballou, Jr., Raleigh, NC (US); John H. Hebrank, Durham, NC (US); Laurie McNeil, Chapel Hill, NC (US)

(73) Assignee: Ochoa Optics LLC, Las Vegas, NV (US)

( * ) Notice: Subject to any disclaimer, the term of this patent is extended or adjusted under 35 U.S.C. 154(b) by 2306 days.

(21) Appl. No.: 10/243,826

(22) Filed: Sep. 16, 2002

(65) Prior Publication Data
US 2003/0149989 A1 Aug. 7, 2003

Related U.S. Application Data

(60) Provisional application No. 60/322,186, filed on Sep. 14, 2001, provisional application No. 60/322,187, filed on Sep. 14, 2001, provisional application No. 60/326,563, filed on Oct. 2, 2001, provisional application No. 60/325,888, filed on Sep. 28, 2001, provisional application No. 60/328,606, filed on Oct. 11, 2001, provisional application No. 60/347,440, filed on Nov. 7, 2001.

(51) Int. Cl.
*B32B 3/02* (2006.01)
(52) U.S. Cl. .................. 428/64.1; 428/64.4; 430/270.1
(58) Field of Classification Search .............. 428/64.1, 428/64.4; 430/270.11
See application file for complete search history.

(56) References Cited

U.S. PATENT DOCUMENTS

| | | | |
|---|---|---|---|
| 3,373,517 A | 3/1968 | Helperin |
| 3,376,465 A | 4/1968 | Corpew |
| 3,848,193 A | 11/1974 | Martin et al. |
| 3,941,926 A | 3/1976 | Slobodzian et al. |
| 3,983,317 A | 9/1976 | Glorioso |
| 3,993,955 A | 11/1976 | Belcher et al. |
| 3,993,995 A | 11/1976 | Belcher et al. |
| 4,071,857 A | 1/1978 | Whitney et al. |
| 4,094,010 A | 6/1978 | Pepperl et al. |
| 4,155,042 A | 5/1979 | Permut et al. |
| 4,230,990 A | 10/1980 | Lert et al. |
| 4,332,022 A | 5/1982 | Ceshkovsky et al. |
| 4,368,485 A | 1/1983 | Midland |
| 4,476,488 A | 10/1984 | Merrell |
| 4,536,791 A | 8/1985 | Campbell et al. |
| 4,551,770 A | 11/1985 | Plotnick et al. |
| 4,559,480 A | 12/1985 | Nobs |
| 4,575,750 A | 3/1986 | Callahan |
| 4,595,950 A | 6/1986 | Lofberg |
| 4,613,901 A | 9/1986 | Gilhousen et al. |
| 4,654,482 A | 3/1987 | DeAngelis |
| 4,716,410 A | 12/1987 | Nozaki |
| 4,734,779 A | 3/1988 | Levis et al. |
| 4,734,858 A | 3/1988 | Schlafly |
| 4,761,641 A | 8/1988 | Schreiber |
| 4,766,581 A | 8/1988 | Korn et al. |
| 4,789,863 A | 12/1988 | Bush |
| 4,794,465 A | 12/1988 | Van Luyt et al. |
| 4,797,913 A | 1/1989 | Kaplan et al. |
| 4,809,325 A | 2/1989 | Hayashi et al. |
| 4,812,843 A | 3/1989 | Champion, III et al. |
| 4,829,569 A | 5/1989 | Seth-Smith et al. |
| 4,845,700 A | 7/1989 | Koizumi et al. |
| 4,847,825 A | 7/1989 | Levine |
| 4,862,268 A | 8/1989 | Campbell et al. |
| 4,908,713 A | 3/1990 | Levine |
| 4,949,187 A | 8/1990 | Cohen |
| 5,046,090 A | 9/1991 | Walker et al. |
| 5,051,822 A | 9/1991 | Rhoades |
| 5,073,925 A | 12/1991 | Nagata et al. |
| 5,105,418 A | 4/1992 | Kenmotsu et al. |
| 5,107,107 A | 4/1992 | Osborne |
| 5,121,430 A | 6/1992 | Ganzer et al. |
| 5,123,046 A | 6/1992 | Levine |
| 5,133,079 A | 7/1992 | Ballantyne et al. |
| 5,182,669 A | 1/1993 | Chikuma et al. |
| 5,191,573 A | 3/1993 | Hair |
| 5,214,793 A | 5/1993 | Conway et al. |
| 5,233,423 A | 8/1993 | Jernigan et al. |
| 5,235,587 A | 8/1993 | Bearden et al. |
| 5,251,193 A | 10/1993 | Nelson et al. |
| 5,257,017 A | 10/1993 | Jones et al. |
| 5,260,778 A | 11/1993 | Kauffman et al. |
| 5,274,762 A | 12/1993 | Peterson et al. |
| 5,283,731 A | 2/1994 | LaLonde et al. |

(Continued)

FOREIGN PATENT DOCUMENTS
EP 0 756 423 A1 1/1997
(Continued)

OTHER PUBLICATIONS

"About us," http://www.egghead.com/ShowPage.dll?page=hd__aboutus_aboutus_p, printed Sep. 29, 2001.
"Ashton Digital VisionGate 52 15.1'TFT-LCD, Pivot Screen, USB Hub, w/ Speakers," wysiwyg://253/http://auctions.egghead.com... LotNo=66044439, printed Sep. 26, 2001.
"Bid Receipt for Bid No. 5270411," wysiwyg:/220/http://auctions.egghead.com...KioskListing=0, printed Sep. 29, 2001.
"Calimetrics' Multilevel Technology Enables Higher-Performance CD/DVD Recorders: An IDC White Paper," Wolfgang Schlichting, (Copyright 2000).
"Confirm Your Bid." wysiwyg:/220/http://auctions.egghead.com... ShipCountrv=US, printed Sep. 29, 2001.
"DataPlay, Inc.—Universal Recording Media—Discover," http://www/dataplay.com/jsp_files/en/discover/index-music.jsp, downloaded and printed on May 14, 2002, (Copyright 2001).

(Continued)

*Primary Examiner* — Elizabeth Mulvaney
(74) *Attorney, Agent, or Firm* — Woodcock Washburn LLP

(57) ABSTRACT

Methods and systems for content distribution are provided that include a broadcast transmitter for transmitting a signal that comprises content, a receiver for receiving the signal, and an optical disc recorder coupled to the receiver for recording the content to an optical disc, which may be an optically altered optical disc.

41 Claims, 11 Drawing Sheets

U.S. PATENT DOCUMENTS

| | | | |
|---|---|---|---|
| 5,292,568 A * | 3/1994 | Tezuka et al. | 428/64.4 |
| 5,297,204 A | 3/1994 | Levine | |
| 5,311,423 A | 5/1994 | Clark | |
| 5,319,735 A | 6/1994 | Preuss et al. | |
| 5,355,302 A | 10/1994 | Martin et al. | |
| 5,365,282 A | 11/1994 | Levine | |
| 5,373,330 A | 12/1994 | Levine | |
| 5,387,942 A | 2/1995 | Lemelson | |
| 5,393,993 A | 2/1995 | Edmond et al. | |
| 5,410,344 A | 4/1995 | Graves et al. | |
| 5,414,756 A | 5/1995 | Levine | |
| 5,418,713 A | 5/1995 | Allen | |
| 5,420,647 A | 5/1995 | Levine | |
| 5,420,923 A | 5/1995 | Beyers, II et al. | |
| 5,428,606 A | 6/1995 | Moskowitz | |
| 5,438,355 A | 8/1995 | Palmer | |
| 5,440,334 A | 8/1995 | Walters et al. | |
| 5,465,291 A | 11/1995 | Barrus et al. | |
| 5,469,020 A | 11/1995 | Herrick | |
| 5,469,206 A | 11/1995 | Strubbe et al. | |
| 5,473,584 A | 12/1995 | Oshima | |
| 5,483,278 A | 1/1996 | Strubbe et al. | |
| 5,483,535 A | 1/1996 | McMillen et al. | |
| 5,486,819 A | 1/1996 | Horie | |
| 5,495,283 A | 2/1996 | Cowe | |
| 5,497,186 A | 3/1996 | Kawasaki | |
| 5,497,479 A | 3/1996 | Hornbuckle | |
| 5,508,815 A | 4/1996 | Levine | |
| 5,512,935 A | 4/1996 | Majeti et al. | |
| 5,513,260 A | 4/1996 | Ryan | |
| 5,530,751 A | 6/1996 | Morris | |
| 5,532,920 A | 7/1996 | Hartrick et al. | |
| 5,543,856 A | 8/1996 | Rosser et al. | |
| 5,545,454 A * | 8/1996 | Yamada et al. | 428/64.1 |
| 5,550,863 A | 8/1996 | Yurt et al. | |
| 5,557,541 A | 9/1996 | Schulhof et al. | |
| 5,559,549 A | 9/1996 | Hendricks et al. | |
| 5,565,909 A | 10/1996 | Thibadeau et al. | |
| 5,566,315 A | 10/1996 | Milillo et al. | |
| 5,568,272 A | 10/1996 | Levine | |
| 5,572,442 A | 11/1996 | Schulhof et al. | |
| 5,592,511 A | 1/1997 | Schoen et al. | |
| 5,592,551 A | 1/1997 | Lett et al. | |
| 5,592,626 A | 1/1997 | Papadimitriou et al. | |
| 5,598,397 A | 1/1997 | Sim | |
| 5,600,839 A | 2/1997 | MacDonald | |
| 5,610,653 A | 3/1997 | Abecassis | |
| 5,612,741 A | 3/1997 | Loban et al. | |
| 5,619,247 A | 4/1997 | Russo | |
| 5,621,840 A | 4/1997 | Kawamura et al. | |
| 5,621,863 A | 4/1997 | Boulet et al. | |
| 5,627,895 A | 5/1997 | Owaki | |
| 5,628,050 A | 5/1997 | McGraw et al. | |
| 5,630,067 A | 5/1997 | Kindell et al. | |
| 5,638,113 A | 6/1997 | Lappington et al. | |
| 5,640,453 A | 6/1997 | Schuchman et al. | |
| 5,644,859 A | 7/1997 | Hsu | |
| 5,646,603 A | 7/1997 | Nagata et al. | |
| 5,646,997 A | 7/1997 | Barton | |
| 5,654,747 A | 8/1997 | Ottesen et al. | |
| 5,659,366 A | 8/1997 | Kerman | |
| 5,659,613 A | 8/1997 | Copeland et al. | |
| 5,661,516 A | 8/1997 | Carles | |
| 5,664,018 A | 9/1997 | Leighton | |
| 5,675,734 A | 10/1997 | Hair | |
| 5,682,206 A | 10/1997 | Wehmeyer et al. | |
| 5,684,918 A | 11/1997 | Abecassis | |
| 5,686,954 A | 11/1997 | Yoshinobu et al. | |
| 5,689,799 A | 11/1997 | Dougherty et al. | |
| 5,692,214 A | 11/1997 | Levine | |
| 5,701,161 A | 12/1997 | Williams et al. | |
| 5,701,383 A | 12/1997 | Russo et al. | |
| 5,701,397 A | 12/1997 | Steimle et al. | |
| 5,710,869 A | 1/1998 | Godefray et al. | |
| 5,717,814 A | 2/1998 | Abecassis | |
| 5,717,832 A | 2/1998 | Steimle et al. | |
| 5,721,827 A | 2/1998 | Logan et al. | |
| 5,721,951 A | 2/1998 | DorEl | |
| 5,724,062 A | 3/1998 | Hunter | |
| 5,724,091 A | 3/1998 | Freeman et al. | |
| 5,724,525 A | 3/1998 | Beyers, II et al. | |
| 5,729,214 A | 3/1998 | Moore | |
| 5,734,413 A | 3/1998 | Lappington et al. | |
| 5,734,720 A | 3/1998 | Salganicoff | |
| 5,734,781 A | 3/1998 | Cantone | |
| 5,740,326 A | 4/1998 | Boulet et al. | |
| 5,745,569 A | 4/1998 | Moskowitz et al. | |
| 5,748,716 A | 5/1998 | Levine | |
| 5,758,257 A | 5/1998 | Herz et al. | |
| 5,760,820 A | 6/1998 | Eda et al. | |
| 5,761,606 A | 6/1998 | Wolzien | |
| 5,761,721 A | 6/1998 | Baldus et al. | |
| 5,771,334 A | 6/1998 | Yamauchi et al. | |
| 5,781,734 A | 7/1998 | Ohno et al. | |
| 5,790,202 A | 8/1998 | Kummer et al. | |
| 5,790,935 A | 8/1998 | Payton | |
| 5,790,937 A | 8/1998 | Gutle | |
| 5,799,285 A | 8/1998 | Klingman | |
| 5,805,154 A | 9/1998 | Brown | |
| 5,805,763 A | 9/1998 | Lawler et al. | |
| 5,809,139 A | 9/1998 | Girod et al. | |
| 5,815,484 A * | 9/1998 | Smith et al. | 369/275.1 |
| 5,815,662 A | 9/1998 | Ong | |
| 5,818,806 A | 10/1998 | Wong et al. | |
| 5,822,291 A | 10/1998 | Brindze et al. | |
| 5,822,432 A | 10/1998 | Moskowitz et al. | |
| 5,825,407 A | 10/1998 | Cowe et al. | |
| 5,826,123 A | 10/1998 | Lai | |
| 5,828,402 A | 10/1998 | Collings | |
| RE35,954 E | 11/1998 | Levine | |
| 5,832,287 A | 11/1998 | Atalla | |
| 5,835,896 A | 11/1998 | Fisher et al. | |
| 5,841,979 A | 11/1998 | Schulhof et al. | |
| 5,845,083 A | 12/1998 | Hamadani et al. | |
| 5,848,129 A | 12/1998 | Baker | |
| 5,848,155 A | 12/1998 | Cox | |
| 5,848,352 A | 12/1998 | Dougherty et al. | |
| 5,854,779 A | 12/1998 | Johnson et al. | |
| 5,857,020 A | 1/1999 | Peterson, Jr. | |
| 5,860,068 A | 1/1999 | Cook | |
| 5,862,260 A | 1/1999 | Rhoads | |
| 5,870,717 A | 2/1999 | Wiecha | |
| 5,874,985 A | 2/1999 | Matthews, III | |
| 5,878,017 A | 3/1999 | Ikegame | |
| 5,884,284 A | 3/1999 | Peters et al. | |
| 5,889,868 A | 3/1999 | Moskowitz et al. | |
| 5,890,136 A | 3/1999 | Kipp | |
| 5,897,622 A | 4/1999 | Blinn et al. | |
| 5,898,384 A | 4/1999 | Alt et al. | |
| 5,899,980 A | 5/1999 | Wilf et al. | |
| 5,903,262 A | 5/1999 | Ichihashi et al. | |
| 5,903,878 A | 5/1999 | Talati | |
| 5,905,713 A | 5/1999 | Anderson et al. | |
| 5,905,800 A | 5/1999 | Moskowitz et al. | |
| 5,909,492 A | 6/1999 | Payne et al. | |
| 5,914,712 A | 6/1999 | Sartain et al. | |
| 5,914,774 A | 6/1999 | Ota | |
| 5,915,018 A | 6/1999 | Aucsmith | |
| 5,915,027 A | 6/1999 | Cox et al. | |
| 5,915,068 A | 6/1999 | Levine | |
| 5,918,213 A | 6/1999 | Bernard et al. | |
| 5,930,369 A | 7/1999 | Cox et al. | |
| 5,931,901 A | 8/1999 | Wolfe et al. | |
| 5,933,499 A | 8/1999 | Enari | |
| 5,933,798 A | 8/1999 | Linnartz | |
| 5,934,795 A | 8/1999 | Rykowski et al. | |
| 5,940,135 A | 8/1999 | Petrovic et al. | |
| 5,940,807 A | 8/1999 | Purcell | |
| 5,943,670 A | 8/1999 | Prager | |
| 5,946,665 A | 8/1999 | Suzuki et al. | |
| 5,949,885 A | 9/1999 | Leighton | |
| 5,956,716 A | 9/1999 | Kenner et al. | |
| 5,959,885 A | 9/1999 | Rao | |
| 5,959,945 A | 9/1999 | Kleiman et al. | |
| 5,960,081 A | 9/1999 | Vynne et al. | |
| 5,960,411 A | 9/1999 | Hartman et al. | |
| 5,963,217 A | 10/1999 | Grayson et al. | |

| Patent | Date | Inventor |
|---|---|---|
| 5,963,264 A | 10/1999 | Jackson |
| 5,963,915 A | 10/1999 | Kirsch |
| 5,963,917 A | 10/1999 | Ogram |
| 5,966,440 A | 10/1999 | Hair |
| 5,966,697 A | 10/1999 | Fergerson et al. |
| 5,969,283 A | 10/1999 | Looney et al. |
| 5,969,715 A | 10/1999 | Dougherty et al. |
| 5,970,471 A | 10/1999 | Hill |
| 5,970,472 A | 10/1999 | Allsop et al. |
| 5,970,473 A | 10/1999 | Gerszberg et al. |
| 5,970,474 A | 10/1999 | Leroy et al. |
| 5,970,475 A | 10/1999 | Barnes et al. |
| 5,974,396 A | 10/1999 | Anderson et al. |
| 5,978,775 A | 11/1999 | Chen |
| 5,983,199 A | 11/1999 | Kaneko |
| 5,983,200 A | 11/1999 | Slotznick |
| 5,983,201 A | 11/1999 | Fay |
| 5,988,078 A | 11/1999 | Levine |
| 5,991,399 A | 11/1999 | Graunke et al. |
| 5,992,888 A | 11/1999 | North et al. |
| 6,002,772 A | 12/1999 | Saito |
| 6,005,938 A | 12/1999 | Banker et al. |
| 6,006,332 A | 12/1999 | Rabne et al. |
| 6,011,722 A * | 1/2000 | Bude et al. ............... 365/185.24 |
| 6,012,086 A | 1/2000 | Lowell |
| 6,013,007 A | 1/2000 | Root et al. |
| 6,014,491 A | 1/2000 | Hair |
| 6,023,451 A * | 2/2000 | Kashiwagi et al. ........ 369/275.5 |
| 6,025,868 A | 2/2000 | Russo |
| 6,029,045 A | 2/2000 | Picco et al. |
| 6,029,141 A | 2/2000 | Bezos et al. |
| 6,032,130 A | 2/2000 | Alloul et al. |
| 6,041,316 A | 3/2000 | Allen |
| 6,044,047 A | 3/2000 | Kulas |
| 6,052,554 A | 4/2000 | Hendricks et al. |
| 6,061,440 A | 5/2000 | Delaney et al. |
| 6,064,980 A | 5/2000 | Jacobi et al. |
| 6,067,107 A | 5/2000 | Travaille et al. |
| 6,067,532 A | 5/2000 | Gebb |
| 6,069,868 A | 5/2000 | Kashiwagi |
| 6,072,982 A | 6/2000 | Haddad |
| 6,073,372 A | 6/2000 | Davis |
| 6,081,785 A | 6/2000 | Oshima et al. |
| 6,088,455 A | 7/2000 | Logan et al. |
| 6,088,722 A | 7/2000 | Herz et al. |
| 6,091,883 A | 7/2000 | Artigalas et al. |
| 6,112,192 A | 8/2000 | Capek |
| 6,115,348 A | 9/2000 | Guerra |
| 6,118,976 A | 9/2000 | Arias et al. |
| 6,119,096 A | 9/2000 | Mann et al. |
| 6,122,403 A | 9/2000 | Rhoads |
| 6,131,130 A | 10/2000 | Van Ryzin |
| 6,141,530 A | 10/2000 | Rabowsky |
| 6,147,715 A | 11/2000 | Yuen et al. |
| 6,148,033 A | 11/2000 | Pearlstein et al. |
| 6,148,142 A | 11/2000 | Anderson |
| 6,148,428 A | 11/2000 | Welch et al. |
| 6,150,964 A | 11/2000 | McLaughlin |
| 6,151,600 A | 11/2000 | Dedrick |
| 6,175,840 B1 | 1/2001 | Chen et al. |
| 6,177,931 B1 | 1/2001 | Alexander et al. |
| 6,198,875 B1 | 3/2001 | Edenson et al. |
| 6,201,777 B1 | 3/2001 | Tsuchiya et al. |
| 6,209,787 B1 | 4/2001 | Iida |
| 6,226,618 B1 | 5/2001 | Downs et al. |
| 6,228,440 B1 * | 5/2001 | Dailey et al. ................... 428/1.1 |
| 6,229,453 B1 | 5/2001 | Gardner et al. |
| 6,233,389 B1 | 5/2001 | Barton et al. |
| 6,233,682 B1 | 5/2001 | Fritsch |
| 6,238,763 B1 | 5/2001 | Sandstrom |
| 6,240,401 B1 | 5/2001 | Oren et al. |
| 6,243,350 B1 | 6/2001 | Knight et al. |
| 6,247,130 B1 | 6/2001 | Fritsch |
| 6,249,532 B1 | 6/2001 | Yoshikawa et al. |
| 6,265,424 B1 | 7/2001 | Tisdell et al. |
| 6,269,394 B1 | 7/2001 | Kenner et al. |
| 6,272,636 B1 | 8/2001 | Neville et al. |
| 6,288,753 B1 | 9/2001 | DeNicola et al. |
| 6,297,859 B1 | 10/2001 | George |
| 6,343,738 B1 | 2/2002 | Ogilvie |
| 6,363,356 B1 | 3/2002 | Horstmann |
| 6,385,596 B1 | 5/2002 | Wiser et al. |
| 6,400,996 B1 | 6/2002 | Hoffberg et al. |
| 6,405,203 B1 | 6/2002 | Collart |
| 6,408,313 B1 | 6/2002 | Campbell et al. |
| 6,424,998 B2 | 7/2002 | Hunter |
| 6,430,603 B2 | 8/2002 | Hunter |
| 6,430,605 B2 | 8/2002 | Hunter |
| 6,438,579 B1 | 8/2002 | Hosken |
| 6,453,420 B1 | 9/2002 | Collart |
| 6,456,331 B2 | 9/2002 | Kwoh |
| 6,463,467 B1 | 10/2002 | Mages et al. |
| 6,493,874 B2 | 12/2002 | Humpleman |
| 6,496,822 B2 | 12/2002 | Rosenfelt et al. |
| 6,504,798 B1 | 1/2003 | Revis |
| 6,519,341 B1 | 2/2003 | Enari |
| 6,519,571 B1 | 2/2003 | Guheen et al. |
| 6,522,769 B1 | 2/2003 | Rhoads et al. |
| 6,529,526 B1 | 3/2003 | Schneidewend |
| 6,540,397 B2 * | 4/2003 | Yoshinari et al. ............. 368/286 |
| 6,549,719 B2 | 4/2003 | Mankovitz |
| 6,574,424 B1 | 6/2003 | Dimitri et al. |
| 6,604,240 B2 | 8/2003 | Ellis et al. |
| 6,606,744 B1 | 8/2003 | Mikurak |
| 6,611,820 B2 | 8/2003 | Oshima et al. |
| 6,621,933 B2 | 9/2003 | Chung et al. |
| 6,625,333 B1 | 9/2003 | Wang et al. |
| 6,637,029 B1 | 10/2003 | Maissel et al. |
| 6,641,886 B1 * | 11/2003 | Bakos et al. .................. 428/64.1 |
| 6,647,417 B1 | 11/2003 | Hunter et al. |
| 6,662,231 B1 | 12/2003 | Drosset et al. |
| 6,681,326 B2 | 1/2004 | Son et al. |
| 6,697,948 B1 | 2/2004 | Rabin et al. |
| 6,708,157 B2 | 3/2004 | Stefik et al. |
| 6,718,551 B1 | 4/2004 | Swix et al. |
| 6,728,271 B1 | 4/2004 | Kawamura et al. |
| 6,728,713 B1 | 4/2004 | Beach et al. |
| 6,732,366 B1 | 5/2004 | Russo |
| 6,735,251 B2 | 5/2004 | Sugahara |
| 6,756,997 B1 | 6/2004 | Ward et al. |
| 6,760,442 B1 | 7/2004 | Scott |
| 6,769,020 B2 | 7/2004 | Miyazaki et al. |
| 6,772,331 B1 | 8/2004 | Hind et al. |
| 6,778,678 B1 | 8/2004 | Podilchuk et al. |
| 6,783,886 B1 | 8/2004 | Hunter et al. |
| 6,799,326 B2 | 9/2004 | Boylan et al. |
| 6,810,131 B2 | 10/2004 | Nakagawa et al. |
| 6,829,301 B1 | 12/2004 | Tinker et al. |
| 6,829,368 B2 | 12/2004 | Meyer et al. |
| 6,842,522 B1 | 1/2005 | Downing |
| 6,850,901 B1 | 2/2005 | Hunter et al. |
| 6,881,465 B2 * | 4/2005 | Ogawa et al. ................. 428/64.1 |
| 6,889,383 B1 | 5/2005 | Jarman |
| 6,928,423 B1 | 8/2005 | Yamanaka |
| 6,931,534 B1 | 8/2005 | Jandel et al. |
| 6,931,657 B1 | 8/2005 | Marsh |
| 6,944,600 B2 | 9/2005 | Stefik et al. |
| 6,948,070 B1 | 9/2005 | Ginter et al. |
| 6,952,685 B1 | 10/2005 | Hunter et al. |
| 6,956,833 B1 | 10/2005 | Yukie et al. |
| 6,990,678 B1 | 1/2006 | Zigmond |
| 6,999,946 B2 | 2/2006 | Nuttall |
| 7,006,974 B2 | 2/2006 | Burchard et al. |
| 7,032,237 B2 | 4/2006 | Tsunoda et al. |
| 7,039,684 B2 | 5/2006 | Blockton et al. |
| 7,047,302 B2 | 5/2006 | Chatani et al. |
| 7,120,800 B2 | 10/2006 | Ginter et al. |
| 7,130,892 B2 | 10/2006 | Mukai |
| 7,155,733 B2 | 12/2006 | Rodriguez et al. |
| 7,169,334 B2 | 1/2007 | Yamamoto et al. |
| 7,191,153 B1 | 3/2007 | Braitberg et al. |
| 7,197,758 B1 | 3/2007 | Blackketter et al. |
| 7,209,900 B2 | 4/2007 | Hunter et al. |
| 7,233,781 B2 | 6/2007 | Hunter et al. |
| 7,251,330 B2 | 7/2007 | Terao et al. |
| 7,263,188 B2 | 8/2007 | Kohno |
| 7,269,634 B2 | 9/2007 | Getsin et al. |
| 7,313,802 B1 | 12/2007 | Tomsen |

| | | |
|---|---|---|
| 7,359,881 B2 | 4/2008 | Stefik et al. |
| 7,370,016 B1 | 5/2008 | Hunter et al. |
| 7,383,564 B2 | 6/2008 | White et al. |
| 7,428,639 B2 | 9/2008 | Demos |
| 7,440,674 B2 | 10/2008 | Plotnick et al. |
| 7,487,128 B2 | 2/2009 | Spagna et al. |
| 7,499,564 B2 | 3/2009 | Rhoads |
| 7,539,110 B2 | 5/2009 | Mizuno et al. |
| 2001/0003846 A1 | 6/2001 | Rowe et al. |
| 2001/0013037 A1 | 8/2001 | Matsumoto |
| 2001/0013120 A1 | 8/2001 | Tsukamoto |
| 2001/0016836 A1 | 8/2001 | Boccon-Gibod et al. |
| 2001/0018742 A1 | 8/2001 | Hirai |
| 2001/0018858 A1 | 9/2001 | Dwek |
| 2001/0023416 A1 | 9/2001 | Hosokawa |
| 2001/0025259 A1 | 9/2001 | Rouchon |
| 2001/0025269 A1 | 9/2001 | Otsuka |
| 2001/0025316 A1 | 9/2001 | Oh |
| 2001/0027563 A1 | 10/2001 | White et al. |
| 2001/0029491 A1 | 10/2001 | Yoneta et al. |
| 2001/0029583 A1 | 10/2001 | Palatov et al. |
| 2001/0030660 A1 | 10/2001 | Zainoulline |
| 2001/0032131 A1 | 10/2001 | Mowry |
| 2001/0032132 A1 | 10/2001 | Moran |
| 2001/0032133 A1 | 10/2001 | Moran |
| 2001/0032312 A1 | 10/2001 | Runje et al. |
| 2001/0034635 A1 | 10/2001 | Winters |
| 2001/0037465 A1 | 11/2001 | Hart et al. |
| 2001/0042043 A1 | 11/2001 | Shear et al. |
| 2001/0047298 A1 | 11/2001 | Moore et al. |
| 2002/0028024 A1 | 3/2002 | Jayant et al. |
| 2002/0056112 A1 | 5/2002 | Dureau et al. |
| 2002/0056118 A1 | 5/2002 | Hunter et al. |
| 2002/0057799 A1 | 5/2002 | Kohno |
| 2002/0066025 A1 | 5/2002 | Sato et al. |
| 2002/0095357 A1 | 7/2002 | Hunter et al. |
| 2002/0100043 A1 | 7/2002 | Lowthert et al. |
| 2002/0103699 A1 | 8/2002 | Figueiras Ferreiro |
| 2002/0112235 A1 | 8/2002 | Ballou et al. |
| 2002/0112243 A1 | 8/2002 | Hunter et al. |
| 2002/0120925 A1 | 8/2002 | Logan |
| 2002/0124251 A1 | 9/2002 | Hunter et al. |
| 2002/0184047 A1 | 12/2002 | Plotnick et al. |
| 2003/0004796 A1 | 1/2003 | Struble |
| 2003/0017295 A1* | 1/2003 | Ishida et al. ............ 428/64.4 |
| 2003/0028888 A1 | 2/2003 | Hunter et al. |
| 2003/0061607 A1 | 3/2003 | Hunter et al. |
| 2003/0067554 A1 | 4/2003 | Klarfeld et al. |
| 2003/0133692 A1 | 7/2003 | Hunter |
| 2004/0083492 A1 | 4/2004 | Goode et al. |
| 2004/0103439 A1 | 5/2004 | Macrae et al. |
| 2005/0010949 A1 | 1/2005 | Ward et al. |
| 2005/0182730 A1 | 8/2005 | Hunter et al. |
| 2006/0195548 A1 | 8/2006 | Hunter et al. |
| 2006/0212892 A1 | 9/2006 | Hunter et al. |
| 2006/0212908 A1 | 9/2006 | Hunter et al. |
| 2006/0225332 A1 | 10/2006 | Zenisek |
| 2006/0229904 A1 | 10/2006 | Hunter et al. |
| 2006/0294016 A1 | 12/2006 | Hunter et al. |
| 2007/0028276 A1 | 2/2007 | Inoue et al. |
| 2007/0110240 A1 | 5/2007 | Moskowitz et al. |
| 2007/0186272 A1 | 8/2007 | Hunter et al. |
| 2007/0234391 A1 | 10/2007 | Hunter et al. |
| 2007/0276740 A1 | 11/2007 | Hunter et al. |
| 2009/0099968 A1 | 4/2009 | Hunter et al. |

FOREIGN PATENT DOCUMENTS

| | | |
|---|---|---|
| EP | 0 683 943 B1 | 9/1998 |
| EP | 0 942 417 A2 | 3/1999 |
| EP | 0 954 176 A2 | 11/1999 |
| EP | 0 954 179 A2 | 11/1999 |
| EP | 0 975 111 A2 | 1/2000 |
| EP | 0 977 389 A2 | 2/2000 |
| EP | 0 984 631 A1 | 3/2000 |
| EP | 0 994 470 A2 | 4/2000 |
| EP | 1252732 B1 | 1/2001 |
| EP | 1 104 195 A2 | 5/2001 |
| EP | 1 143 721 A1 | 10/2001 |
| EP | 1226715 B1 | 4/2008 |
| JP | 360253082 A | 12/1985 |
| JP | 407143081 A | 6/1995 |
| JP | 410290441 A | 10/1998 |
| JP | 11 150517 A | 6/1999 |
| JP | 11 163811 A | 6/1999 |
| JP | 11 231077 A | 8/1999 |
| JP | 11 259764 A | 9/1999 |
| JP | 11 331150 A | 11/1999 |
| JP | 2002015333 | 1/2002 |
| JP | 2002099283 | 4/2002 |
| JP | 2002156979 | 5/2002 |
| TW | 503657 | 9/2002 |
| TW | 527835 | 4/2003 |
| TW | 1279100 | 4/2007 |
| WO | WO 91/03112 | 3/1991 |
| WO | WO 92/22983 | 12/1992 |
| WO | WO 94/13107 | 6/1994 |
| WO | WO 96/26605 | 8/1996 |
| WO | WO 96/34467 | 10/1996 |
| WO | WO 96/34494 | 10/1996 |
| WO | WO 98/26357 | 6/1998 |
| WO | WO 98/27732 | 6/1998 |
| WO | WO 99/18727 | 4/1999 |
| WO | WO 99/31842 | 6/1999 |
| WO | WO 00/05886 | 2/2000 |
| WO | WO 00/07368 | 2/2000 |
| WO | WO 00/14965 | 3/2000 |
| WO | WO 01/01677 | 1/2001 |
| WO | WO 01/17242 | 3/2001 |
| WO | WO 0117242 | 3/2001 |
| WO | WO 01/41013 | 6/2001 |
| WO | WO 01/47249 | 6/2001 |
| WO | WO 01/54324 | 7/2001 |
| WO | WO 01/54410 | 7/2001 |
| WO | WO 01/74050 | 10/2001 |
| WO | WO 01/82625 | 11/2001 |
| WO | WO 02/065750 | 8/2002 |

OTHER PUBLICATIONS

"DataPlay, Inc.—Universal Recording Media—Industry," http://www.dataplay.com/jsp_files/en/industry.contentproviders.jsp, downloaded and printed on May 14, 2002. (Copyright 2001).

"DataPlay, Inc.—Universal Recording Media—Industry," http://www.dataplay.com/jsp_files/en/industry/index.jsp, downloaded and printed on May 14, 2002. (Copyright 2001).

"DataPlay, Inc.—Universal Recording Media—Industry," http://www.dataplay.com/jsp_files/en/industry/products-contentkep.jsp, downloaded and printed on May 14, 2002. (Copyright 2001).

"DataPlay, Inc.—Universal Recording Media—Industry," http://www.dataplay.com/jsp_files/en/industry/products-digitalmedia.jsp, downloaded and printed on May 14, 2002. (Copyright 2001).

"DataPlay,Inc.—Universal Recording Media—Industry," http://www.dataplay.com/jsp_files/en/industry/products-engines.jsp, downloaded and printed on May 14, 2002. (Copyright 2001).

"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).

"DataPlay, Inc.—Universal Recording Media—What's Playing on DataPlay," http://www/dataplay.com/servlets/ProductList?action=productSearch, downloaded and printed on May 14, 2002, (Copyright 2001).

"Demographics profile," http://www.egghead.com/ShowPage.dll?page=hd_aboutus_demo_p, printed Sep. 29, 2001.

"Enter Your Bid," https://auctions.egghead.com/scripts/. . . LotNo=66044439, printed Sep. 29, 2001.

"Enter Your Bid." wysiwyq://218/http://auctions.egghead.com... 5a99, printed Sep. 29, 2001.

"How Wink Works," http://www.wink.com/contents/howitworks.shtml, downloaded and printed on May 14, 2002.

"ICAP and HTML (ATVEF)," http://www.wink.com/contents/tech_icap.shtml. downloaded and printed on May 14, 2002.

"Internet Archive Way Back Machine—Searched for http://www.egghead.com," printed Apr. 8, 2002 (Copyright 2001).
"Internet Archive Way Back Machine—Searched for http://www.onsale.com," printed Apr. 8, 2002, (Copyright 2001).
"Login/Logout," http://www.egghead.com/ShowPage.dll?page=...44439, printed Sep. 29, 2001.
"Making Digital Cinema Actually Happen—What it Takes and Who's Going to Do It," Steven A Morley, (Copyright 1998).
"New Credit Information," https://secure.fairmarket.com/secure/Cre...FM1001, printed Sep. 26, 2001.
"Onsale Invoice," http://www.onsale.com/cgi-win/invoice.exe, dated Jan. 19, 1998, printed Jan. 20, 1998, (Copyright 1997).
"Privacy and Security Policy," http://www.egghead.com/ShowPage.dll?page=hd_policy_policyandprivacy_p, printed Sep. 29, 2001.
"Quadrant 256MB, PC133 (PC-100 Compatible), 32X64, 7ns, 168-Pin, SdRAM DIMM Module (New)," wysiwyg://253/http://auctions.egghead.com...LotNo=65659811&BatchNo=0, printed Sep. 24, 2001.
"Registration," http://www.egghead.com/ShowPaqe.dll?page=reg_pagel_ceos&S=1, printed Sep. 26, 2001.
"Sell Goods to Egghead.com." http://www.egghead.com/ShowPage.dll?page=hd_aboutus_sellgoods_p, printed Sep. 29, 2001.
"Streaming Onto the Movie Screen, with Nary a Scratch," Karen J. Bannan, The New York Times, May 9, 2002, p. E5.
"The Wink System." http://www.wink.com/contents/tech_diagram.shtml, downloaded and printed on May 14, 2002.
"Universal Product Code (UPC) and EAN Article Numbering Code (EAN) Page," http://www.adamsl.com/pub/russadam/upccode.html, by Russ Adams, printed Sep. 24, 2001.
"What is Wink: Examples," http://www.wink.com/contents/examples.shtml, downloaded and printed on May 14, 2002.
"What's Playing on DataPlay—Everything Digital," DataPlay Digital Media Product Brochure, downloaded and printed on May 14, 2002, (Copyright 2000-2001).
"What's Playing on DataPlay—Everything Digital," DataPlay Micro-optical Engine Product Brochure, downloaded and printed on May 14, 2002, (Copyright 2000-2002).
"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1988.
"Wink Broadcast Server," http://www.wink.com/contents/tech_wbs.shtml, downloaded and printed on May 14, 2002.
"Wink Client Software," http://www.wink.com/contents/tech_engine.shtml, downloaded and printed on May 14, 2002.
"Wink Communications, Inc., Changes the Advertising Landscape," http://www.wink.com/contents/PressReleases/930709807/content.shtml, downloaded and printed on May 14, 2002, dated Jan. 21, 1999.
"Wink Response Server and Wink Response Network," http://www.wink.com/contents/tech_wrs.shtml, downloaded and printed on May 14, 2002.
"Wink Studio and Wink Server Studio," http://www.wink.com/contents/tech_studio.shtml, downloaded and printed on May 14, 2002.
"Wink's History," http://www.wink.com/contents/history.shtml, downloaded and printed on May 14, 2002.
"Wink Television Press Room," http://www.wink.com/contents/PressReleases.shtml, downloaded and printed on May 14, 2002.
DVD-Video Format Book Specification, Version 1.11, published Mar. 1999 by Toshiba Corporation on behalf of DVD forum.
Egghead Packing Receipt (Franklin Rex Organizer), received Dec. 1999.
IBM Technical Disclosure Bulletin, "Multimedia Audio on Demand," 1994, 37, 1 page (Abstract only).
Connell, N., "Conference on Lasers and Electro-Optics: Perspectives on Printing, Storage and Display," 1996 Tech Digest Series, vol. 9.
Tsuchiya et al., "High Density Digital Videodics Using 635 nm Laser Diode," IEEE, Aug. 1994, 6 pages.
Sennaroglu et al., "Generation of Tunable Femtosecond Pulses in the 1.21-1.27 um and 605-635 nm Wavelength Region by Using a regenertively Initiated Self-Mode-Locked Cr: Forsterite Laser," IEEE, Aug. 1994, 11 pages.
Onsale Packing Sheet (Jason Deep Space Series 225 × 60 Astronomy Telescope), received Jul. 1999.
U.S. Appl. No. 09/385,671 Charles Eric Hunter, filed Aug. 27, 1999.
U.S. Appl. No. 09/476,078 Charles Eric Hunter, filed Dec. 30, 1999.
U.S. Appl. No. 09/493,854 Charles Eric Hunter et al, filed Jan. 28, 2000.
U.S. Appl. No. 09/553,524 Charles Eric Hunter et al, filed Apr. 20, 2000.
U.S. Appl. No. 09/645,087 Charles Eric Hunter et al, filed Aug. 24, 2000.
U.S. Appl. No. 09/675,025 Charles Eric Hunter et al, filed Sep. 28, 2000.
U.S. Appl. No. 09/707,273 Charles Eric Hunter et al, filed Nov. 6, 2000.
U.S. Appl. No. 11/801,109 Charles Eric Hunter et al, filed May 7, 2007.
U.S. Appl. No. 60/169,274, pp. 1-45, filed on Dec 7, 1999, 109 pages.
U.S. Appl. No. 11/468,959, filed Aug. 31, 2006, Hunter et al.
U.S. Appl. No. 11/468,963, filed Aug. 31, 2006, Hunter et al.
U.S. Appl. No. 11/468,969, filed Aug. 31, 2006, Hunter et al.
U.S. Appl. No. 11/469,130, filed Aug. 31, 2006, Hunter et al.
U.S. Appl. No. 11/469,292, filed Aug. 31, 2006, Hunter et al.
U.S. Appl. No. 11/469,319, filed Aug. 31, 2006, Hunter et al.
About.com, "Circuit City's DIVX Format Bites the Dust!" published Jun. 21, 1999; source: www.hometheater.about.com.
ISO-IEC 13818-1, First edition. "Information technology—Generic coding of moving pictures and associated audio information: Systems." International Organization for Standardization (ISO) and International Electrotechnical Commission (IEC). Apr. 15, 1996. p. 1-6.
United States Patent and Trademark Office; Non-Final Office Action dated Sep. 17, 2008, U.S. Appl. No. 11/469,358.
United States Patent and Trademark Office: Final Office Action dated Mar. 19, 2009, U.S. Appl. No. 11/469,358.
United States Patent and Trademark Office: Non-Final Office Action dated Aug. 5, 2009, U.S. Appl. No. 11/469,358.
United States Patent and Trademark Office: Non-Final Office Action dated Jan. 12, 2009, U.S. Appl. No. 11/361,115.
United States Patent and Trademark Office: Final Office Action dated Sep. 3, 2009, U.S. Appl. No. 11/361,115.
PCT International Preliminary Examination Report received Aug. 3, 2001, in corresponding International Application No. PCT/US00/23410.
PCT International Search Report mailed Nov. 28, 2000, in corresponding International Application No. PCT/US00/23410.
Communication by the Examining Division dated Jul. 29, 2005, in corresponding EP application No. 009594300.
Communication: Supplementary EP Search Report dated Apr. 19, 2005, in corresponding EP application No. 009594300.
PCT International Preliminary Examination Report received Feb. 4, 2002, in corresponding International Application No. PCT/US01/01979.
PCT International Search Report mailed May 17, 2001, in corresponding International Application No. PCT/US01/01979.
Communication by the Examining Division dated Mar. 22, 2004, in corresponding EP application No. 019031848.
PCT International Preliminary Examination Report received Jun. 3, 2002, in corresponding International Application No. PCT/US01/05675.
PCT International Search Report mailed Aug. 28, 2001, in corresponding International Application No. PCT/US01/05675.
United States Patent and Trademark Office: Final Office Action dated Oct. 28, 2009, U.S. Appl. No. 09/781,679.
US 5,825,354, 10/1998, Ahmad et al. (withdrawn)

* cited by examiner

BROADCAST DISTRIBUTION OF CONTENT FOR STORAGE ON HARDWARE PROTECTED OPTICAL STORAGE MEDIA

CROSS REFERENCE TO RELATED APPLICATIONS

This claims the benefit under 35 U.S.C. §119(e) of U.S. Provisional Application No. 60/322,186, filed Sep. 14, 2001, entitled "Ultrahigh Reliability, High Density, Read and Write Data Storage System," the content of which is incorporated herein by reference in its entirety.

This claims the benefit under 35 U.S.C. §119(e) of U.S. Provisional Application No. 60/322,187, filed Sep. 14, 2001, entitled "System and Method for Content Delivery," the content of which is incorporated herein by reference in its entirety.

This claims the benefit under 35 U.S.C. §119(e) of U.S. Provisional Application No. 60/326,563, filed Oct. 2, 2001, entitled "System and Method for Ultrahigh Reliability, High Density, Short Wavelength Laser Read and Write Data Storage System with Content Protection," the content of which is incorporated herein by reference in its entirety.

This claims the benefit under 35 U.S.C. §119(e) of U.S. Provisional Application No. 60/325,888, filed Sep. 28, 2001, entitled "System and Method for Ultrahigh Reliability, High Density, Short Wavelength Laser Read and Write Data Storage System with Content Protection," the content of which is incorporated herein by reference in its entirety.

This claims the benefit under 35 U.S.C. §119(e) of U.S. Provisional Application No. 60/328,606, filed Oct. 11, 2001, entitled "System and Method for Optically Altered DVD (DVDO™)," the content of which is incorporated herein by reference in its entirety.

This claims the benefit under 35 U.S.C. §119(e) of U.S. Provisional Application No. 60/347,440, filed Nov. 7, 2001, entitled "System and Method for Optically Altered DVD (DVDO™)," the content of which is incorporated herein by reference in its entirety.

FIELD OF THE INVENTION

This invention is directed to systems and methods for broadcast distribution of content for storage on optical discs, and more particularly for storage on optically altered discs.

BACKGROUND OF THE INVENTION

Content Distribution

Traditional barriers between broadcast television, direct broadcast satellite networks, cable systems, MMDS, terrestrial network operators, internet technologies, dedicated point to point wide area networks, and general purpose computing have begun to rapidly dissolve. In particular, these technologies are migrating into an integrated whole. The development of interconnection architectures enables these emergent home and portable multimedia entertainment and commerce systems to grow in a manner analogous to the evolution of centralized and distributed computing, transmission, and storage architectures. Current systems are utilized in the distribution of interactive entertainment, all forms of electronic commerce, digital music downloads, digital video downloads, pay-per-view, pay-per-play audio, near or true video-on-demand, near or true audio-on-demand, near or true books-on-demand, software downloads and distribution, interactive advertising, gaming, home banking, education, and regionalized or end user targeted weather and news, among others.

Multimedia portable and home recording and playback technology has similarly evolved with the advent of high-density ROM discs, read and write CD or DVD Discs, high density RAM, and magnetic disc technology. One form of emergent media, known as DataPlay (manufactured by DataPlay, Inc. of Boulder, Colo.), is a portable, physically compact, robust and affordable removable disc media system predicated on DVD technology. DataPlay utilizes various forms of digital rights management to protect content and facilitate commerce of recorded content. For example, DataPlay discs including such content as music or video may be physically distributed under the protection of the digital rights management scheme protecting the content from unauthorized copying or accessing.

One problem within the current art is the extensive capital investment required with new CD, DVD, and other optical disc process lines. Each new generation of optical disc has required extensive investment in process development, manufacturing technology, manufacturing equipment, and related facilities and support. This is especially true as we presently witness the consolidation of present manufacturing lines amongst content providers such as record companies who are trying to mitigate capital expenditures and overhead costs.

Another limitation associated with current content distribution schema are the inherent limitations within the present Digital Rights Management (DRM) as implemented with digital schemas, i.e., advances in processing power available for decryption, collaborative distributed processing efforts such as those utilized to break DES (digital encryption system), human disclosure factors as witnessed by the publication of standard DVD keys, combined with the fact that content is often available in an unencrypted format rendering the cryptographic analysis of the key possible.

The DataPlay disc and other forms of pre-recorded ROM type media, therefore, are limited, to the physical distribution of the discs and recorded content. In addition, the DataPlay art and other forms recordable media are limited by the bandwidth and long latencies inherent to Internet content distribution methodologies. Without immediately available content, currently unavailable to users utilizing such recording media, the DataPlay and other recordable media require users to wait for content prior to recording. Finally, as DataPlay and other recording devices have used standard or publicly available methodologies in the reading or writing device, recorded content is no longer safe from unauthorized access.

Optical Disc Technology

The introduction of the Compact Digital Audio Disc (CD-DA) in 1982 unleashed a transformation in the way consumers obtain and store audio content. In order to achieve the CD's low cost, high reliability (low bit error rates), and consistent audio output quality, many revolutionary technologies had to simultaneously achieve fruition. In specific, the advent of long life double heterojunction AlGaAs laser diodes, low cost diffraction limited optics (diffraction gratings, polarization beam splitters, quarter wave plates, first surface mirrors, and collimating/cylindrical lenses), and high resolution optical scanning/position encoding, employed in conjunction with high resolution digital signal quantization (analog-to-digital converters), analog signal reconstruction (digital-to-analog converters), high stability, low run-out, servo drives and low cost polycarbonate disc manufacturing materials and processes were all necessary to facilitate this revolution in consumer audio distribution.

The current art requires an easy migration path to higher capacity discs utilizing shorter wavelength long life laser diodes (such as 400-410 nanometer (nm) devices), as well as a system compatible with reading both higher capacity discs utilizing shorter wavelength long life laser diodes (such as 400-410 nanometer (nm) devices) and legacy DVDs and CDs.

Modern CDs store about 1 million bits/mm$^2$ on a 12 cm disc. Information is encoded on "pits" within the disc impressed upon a polycarbonate layer. Pits are 0.6 um wide arranged on tracks spaced 1.6 um apart. 22,188 tracks are arranged on each disc over an active surface disc 35.3 mm wide. The bit rate from a disc is 4.3218 megabits/second resulting from a circular linear velocity read rate of 1.2 m/sec and, subtracting for overhead, error correction, and tracking information affords an audio bit stream of 1.41 megabits/second i.e. two channels of audio (stereo) of 16 bit resolution per sample at 44.1 KHz for 4,440 seconds. Thus of the approximately 15.5 billion bits of information on a modern CD, 6.26 billion are available for actual audio information and the balance are allocated for overhead. Thus one limitation within the current art is the high ratio of overhead to data (audio) bits—currently 15.5/6.2, or equivalently 2.5:1. The CD family has witnessed many new members along the years including CD-ROM (1984), CD-i (1986), CD-WO (1988), Video-CD (1994), and CD-R/W (1996). Other limitations within the CD art include low total storage (from 783 to 867 megabytes), low output bandwidth (176 kilobytes/second standard 1×), and limited file format flexibility. While the bandwidth has been improved with a new generation of high velocity readers (52×+), this is fundamentally the outgrowth and deployment of Digital Versatile Disc technology discussed below.

Again, owing to limitations with the CD's storage density and bandwidth, an improved technology was required to support high resolution video for sustained periods of time (e.g. single movies) along with larger quantities of data. In 1997, the Digital Versatile Disc (or Digital Video Disc) was unleashed, based upon the fundamental concepts employed in CD design, albeit with a somewhat shorter wavelength laser diode (635 or 650 nm as compared with a CDs 780 nm laser), improved optics (a Numerical Aperture NA of 0.6 as compared with the CDs NA of 0.45), servo drive (3.49 m/sec on a single layer DVD, 3.84 m/sec on a dual layer DVD as compared with the CDs 1.2 m/sec), bit density improvements including track to track spacing (0.74 um DVD pitch spacing versus a CD's 1.6 um spacing) and linear bit density (DVD single layer 0.40/1.87 um min/max—DVD dual layer 0.44/2.05 um min/max), multiple layers (optional), multiple sides (optional) and mandatory sophisticated microprocessor decoding and error correction. The resultant performance specifications are a recording bit density of 7× improvement from the CD (DVD 7 million bits/mm$^2$ versus the CD's 1 million bits/mm$^2$), a commensurate 7× storage density per DVD layer of 4.7 billion bytes. It should be noted that reduced DVD "pit" size actually accounts for an area density improvement of only 467%, and the remainder of the bit density improvement is from highly improved data encoding and error correction techniques.

A fundamental departure from the CD is found in the universal file structure of the data on a DVD, which is truly near random access (pseudo addressable) data storage. This capability combined with real-time microprocessor interactivity should allow DVD to become the dominant media in video distribution and storage (over VHS and laser disc) along with audio, data storage, and software distribution (over the CD). DVDs are divided amongst six types (specification books A through E as known in the industry)—DVD-ROM, DVD-Video, DVD-Audio, DVD-R, DVD-R/W, DVD-RAM.

DVD disc capacities are not linear per layer. Since the optical system must be refocused to read the outer semi-reflective or inner fully-reflective (embedded layer), signal-to-noise losses occur when reading the inner layer. To compensate the inner embedded track is read at slightly higher rate with a lower bit density. Hence another limitation within the current art is the limited signal to noise ratio achievable with current 635/650 nm laser diodes and multi-layer DVD disc technology. For reference a DVD-5 single side/single layer disc holds 4.7 billon bytes, and as expected DVD-10 double side/single layer disc holds 9.4 billion bytes; a DVD-9 single sided dual layer disc holds 8.5 billion bytes and a DVD-18 dual sided, double layer disc holds 17 billion bytes. Output total bit rates are 26.16 million bits/sec and the maximum out data rate is 11.08 million bits second—for a net aggregate coding overhead ratio of 2.36 (slightly improved from CD overhead of 2.5:1). Thus another limitation within the current art is the still low coding efficiency of DVD technology. Yet another limitation of DVD is found in the low output data rate of 1.385 megabytes/second.

Both pre-recorded and user-recorded data may be included on a single disc. However, a typical DataPlay disc is 32 mm in diameter and holds only about 500 MB of data. Thus one limitation of DataPlay technology is the low total storage capacity of the DataPlay Device. DataPlay devices are presently capable of 0.97 megabytes/second sustained transfer rate of written data and 0.79 megabytes/second transfer rate of ROM data. Thus another limitation of DataPlay devices is their total sustainable read/write bandwidths. Furthermore, because DataPlay technology is based upon DVD technology, other limitations within the current DataPlay technology are the limited signal to noise ratio achievable with current 635/650 nm laser diodes along with the still low coding efficiency.

In order to achieve reasonable laser diode power consumption levels, DataPlay devices utilize unprotected pits and land surfaces to encode data, making them highly vulnerable to damage by handling and contamination. In contrast, standard DVDs (see, ECMA-267 Standard, 3$^{rd}$ Edition, April 2001, which is incorporated by reference in its entirety) utilize two 0.6 mm polycarbonate layers that are bonded together with the data layers protected on the internal surfaces, thus forming a 1.2 mm total DVD thickness. This methodology was developed in response to limitations found in the CD's placement of the data layer near the top surface, where it is extremely vulnerable to damage. Thus another limitation within the current DataPlay art is the use of thin coated surfaces, making them highly vulnerable to damage and debris.

As a direct result of utilizing thin coated surfaces, DataPlay devices incorporate a protective housing for the data surfaces. The housing requires a moveable mechanical assembly to expose an area of the disc for reading and writing of the encoded data. Inherently, all mechanical devices have a lower reliability than a system with no moving parts due to normal wear and tear, along with a greater susceptibility to handling and environmental issues. Further a protective assembly adds cost and complexity to the manufacturing processes, non-recurring design, tooling costs, and per item manufacturing costs. Thus yet another limitation within the current DataPlay art is the need for a protective housing.

Thin coated data encoding surfaces, such as those utilized in DataPlay Devices are highly susceptible to contamination. Since encoded data pits are at or near the focal plane of the read or write optical beam, any contamination residing on the surface of the disc becomes extremely problematic. While the DataPlay device utilizes a protective housing, it requires opening for the reading or writing the disc. As such it is exposed to the external environment within the Datplay player and any internal contamination or humidity. Contamination is cumulative over the life of the disc and contaminants from one DataPlay player may be deposited within another player by utilizing a disc or discs within multiple players. Thus another problem within the current art is that thin coated discs always suffer from a higher bit error rate due to contamination.

As data densities continue to increase, individual "bits" will be encoded on ever smaller surface areas within the disc. Small particulate matter, condensation molecules, and other forms of contamination will be able to induce multi-bit errors that require more sophisticated error correction techniques. For a given size and efficacy of a given contaminant, the number of successive bit errors will be increased as corresponding bit densities increase, requiring more bits to be reserved for bit error correction and reliable tracking, thus reducing the amount of user data available on a given disc. Hence, yet another problem with thin coated discs is the requisite additional error correction bits and encoding scheme, limiting the percentage of useable data bits, along with reducing or eliminating the benefits of increased bit encoding density on the disc.

Thin disc substrates are less susceptible to tilt relative to the read/write optical device. Thus DVDs with their 0.6 mm data to surface distance are less susceptible to tilt errors than CDs which have a 1.2 mm data to surface distance. Conversely, the 1.2 mm CD distance allows the laser beam to be more out of focus at the surface than is that of the 0.6 mm DVD. DVDs are thus required to have a more sophisticated error correction technique to compensate. The thickness of the protective surface is restricted by the optical losses within the protective material. Optical losses are due to surface reflection, absorption, and internal scatter. Clearly the higher the losses the more optical power required for a given bit error rate—translating to increased laser diode or other optical source power consumption and decreased reliability and lifetime. Thus another limitation within the current art is the high optical losses within protective disc coatings, requiring higher power optical sources for given bit error rates. Yet another limitation within the current art is the error due to tilt, which may limit the thickness of practical protective coatings.

Losses within protective disc optical coatings are not the only losses within the optical laser read or write path. Typically the optics within a disc or DataPlay player have substantive losses, up to 75% or more of the laser diode or other source output photons are lost in the read or write optical path. This is due to limitations within the optical materials themselves, the ability to effectively deliver the photons with an optimal spot beam size (energy disc), or the ability to collect reflected/transmitted photons from the data bit surfaces on the disc. Thus another problem within the current art is the lossy optical delivery and collection optics within DataPlay and other optical disc players.

Future applications will require multiple high-resolution movies and/or multiple audio albums on a single storage disc. While the inherent manufacturing costs of prior art CDs and DVDs are modest, the transportation and distribution expenses of single movie or a limited number of audio albums on a single disc prohibits the pre-sale distribution of key encrypted content discs for subsequent sale, i.e. discs are shipped to consumers and unlocked if and when desired for pay per play or purchase. Thus another limitation within the current art is the limited storage density of DVD discs.

The ubiquitous proliferation of illegal DVD decryption software has lead to an industry wide concern of piracy. This is also true of audio content. Further as more consumers have access to broadband Internet links the threat of piracy ever increases. While it may be possible to police the future Napsters of the world, it will not be possible to prohibit piracy between consenting parties. Encoding techniques and other forms of digital rights management fail because of the always-present human element within the system. Thus another limitation within the current art is the limitations of digital encryption technology.

It is therefore desirable to provide secure methods and apparatus for broadcast transmission and high capacity storage of content.

SUMMARY OF THE INVENTION

Consistent with the invention, systems and methods for content distribution are provided that include a broadcast transmitter for transmitting a signal that includes content, a receiver for receiving the signal, and an optical disc recorder coupled to the receiver for recording the content to an optically altered optical disc.

BRIEF DESCRIPTION OF THE DRAWINGS

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

The term "content," as used herein, may include any type of video, audio, textual, or numerical data, in analog or digital form. For example, content can include music, movies, books, video games, and/or other forms of entertainment content.

1. The Content Distribution System

Figure 1:
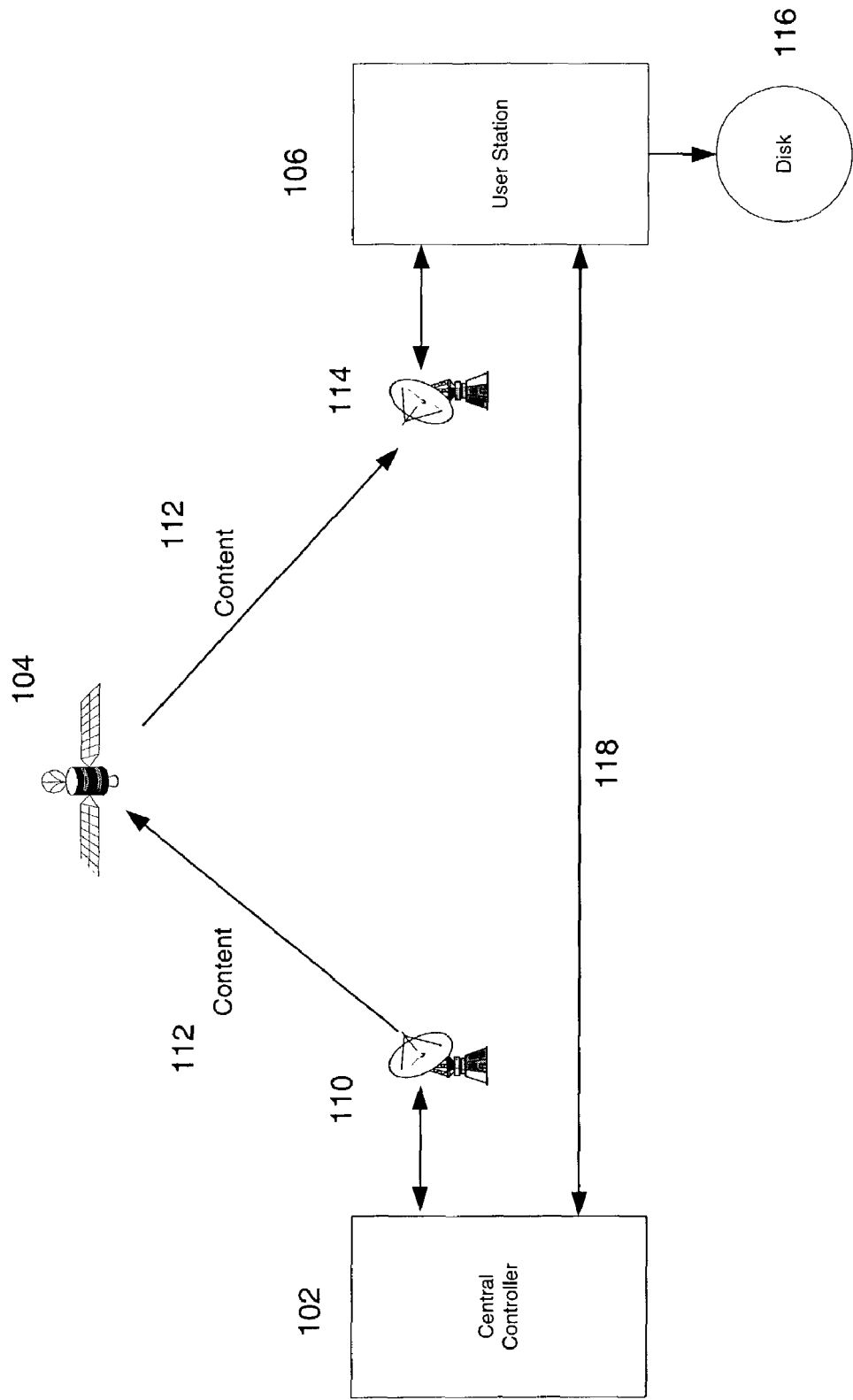
FIG. 1 is block diagram depicting a broadcast distribution system consistent with this invention.

FIG. 1 shows a block diagram depicting illustrative content distribution system 100 for distributing content 112 from a central controller 102 to a user station 106 via a satellite 104. During operation, central controller 102 provides content 112 to a satellite uplink 110, which can broadcast transmit content 112 via satellite 104 to a receiving antenna or dish 114. Consistent with this invention, the term "broadcast transmission" refers generally to any transmission of content originating at at least one transmitter and transmitted to multiple, specified, and/or unspecified recipients. In one embodiment, the term "broadcast transmission" includes transmission only to specified recipients or, in another embodiment, only to unspecified recipients. Thus, broadcast transmission is not limited to satellite or cable broadcast transmission, and can include radio and other types of transmissions. For the sake of brevity, the following description of FIG. 1 only focuses on satellite transmission.

During transmission, program data is received at each user location (e.g., a customer household) through a receiving antenna or dish 114. Dish 114 is linked to a dedicated "box" or user station 106. It will be appreciated, however, that user station can be integrated into a computer, a television, or any other type of content-rendering display device. Upon receipt of the content, user station 106 stores the content on an optically altered optical disc 116 for use by a user.

Consistent with this invention, optically altered optical disc 116 can be manufactured, and content can be written to and read from disc 116, using one or more proprietary hardware protection schemes, as discussed more fully below, rendering the disc unreadable with other recording and playback devices that conform to published standards, including, for example, the ECMA-267 Standard, 3$^{rd}$ Edition, April 2001. In addition, system 100 may include communication link 118 for communication between user station 106 and central controller 102. Further details of the distribution system are provided below and in commonly owned U.S. patent application Ser. Nos. 09/385,671, 09/737,826 and published U.S. Patent Application Publication No. 2002-0111912-A1, the contents of which are incorporated herein by reference in their entireties.

In accordance with FIG. 1, central controller 102 may be any entity capable of providing content 112 to user station 106. In one embodiment, central controller 102 may be the primary content provider, e.g., a publishing company, a recording company, or a production company that produces content 112. In another embodiment, central controller 102 may be any company or entity licensed by or operating in conjunction with the content providers to facilitate the distribution of content 112 to consumers.

In accordance with the present invention, central controller 102 may broadcast content 112, according to a predetermined schedule, according to user preference or user profile information (such as described by U.S. Patent Application Publication No. 2002-0111912-A1). In an alternative embodiment, central controller 102 may broadcast content 112 upon receiving a request from a user. To allow for the user to select content 112 for transmission, the content provider may also distribute available content, scheduling, and/or pricing information to user station 106. Distribution of this information may use the satellite distribution system or, for example, communication link 118.

In addition to broadcasting content 112, central controller system 102 may also perform other functions associated with the distribution of content 112. For example, central controller 102 may include a billing system 108 to bill users for content that has been received and recorded on optically altered optical disc 116. In order to perform this function central controller 102 may store an address (e.g., telephone number, credit card number or billing address) for each user location. Central controller 102 may then receive, via communication link 118, an indication from user station 106 that a user has recorded content on a removable media 116. Central controller system 102 then bills the user, at the address, for the content that was recorded.

2. The Satellite(s)

As shown in FIG. 1, system 100 can use direct broadcast satellite (DBS) transmission via satellite 104 as a means for blanket transmitting content in a real-time or time-compressed format. According to the exemplary embodiment, content transmission is achieved using geostationary satellites, operating in the KU band, that are down-linked to a conventional receiving antennae or dish 114 located at a user location.

Hughes Network Systems of Germantown, Md. (DSS) and EchoStar Communications Corporation of Littleton, Colo. (DISH Network) provide digital broadcast satellite services in the United States consistent with this invention. EchoStar's DISH network launched a satellite in September 1999 that, in combination with its previous satellites, provides continuous transmission of greater than five hundred channels to substantially the entire continental United States. EchoStar now has satellites located in the 119, 110, 61.5 and 148 positions within the Clark Belt. EchoStar's new "DISH 500" system, for example, uses an elliptical twenty-inch antenna or dish containing two LMBS heads that can receive information from two different satellites simultaneously.

Distribution system 100 may utilize the EchoStar Dish 500 system for data transmission at either real time or time-compressed transmission rates. In an alternative embodiment, the invention may be implemented using the DSS system, or a combination of both the Hughes and EchoStar systems (resulting in a relatively smaller portion of system 100's total capacity being devoted to content distribution). EchoStar's DISH 500 system provides a very high band width of approximately 4 megabits/sec for each channel (23 megabits/sec per transponder), for a total transmission capacity of approximately 2,000 megabits/sec for five hundred channels.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity allotted for forward error correction and system management inherent in lower power transponders. Also, along with the use of higher power transponders, the satellite distribution system may utilize quanternary (QPSK) polarization to double the effective bit transfer rate for each transponder over that which may be obtained by using current orthogonal polarization, with an acceptable sacrifice in bit error for those applications of the invention where lower video and audio resolution is not an important consideration to the customer or user. Thus, the use of high power transponders (e.g., 240 watts or higher) in conjunction with higher level polarization (e.g., quanternary) permits distribution system 100 to be implemented utilizing less of the DBS system's total transmission capacity, permits the transmission of a greater number of content selections and/or permits greater time compression of the transmitted content, all to the benefit of consumers.

While it is understood that direct broadcast satellite transmission currently operates in the KU Band, other frequencies can also be employed to achieve similar results. It is understood that content 112 can be transmitted at real or time compressed speeds. In preferred embodiments, content is transmitted at faster than real-time speeds. As used herein, a real-time speed refers to the playback speed of the recorded content. For example, a single satellite transponder capable of 23 megabits/sec transmission can transmit a typical 4 minute song in less than 4 seconds, and in certain cases, about 2 seconds per song. Thus, EchoStar's DBS programming capacity allows transmission of 400,000 to 500,000 song titles (approximately 30,000 to 40,000 CD's) during a four hour period (assuming 4 seconds per song), most preferably during a period of low viewership, e.g., 1:00 AM to 5:00 AM. Using a single transponder for broadcast transmission permits transmission of 500 to 600 CD's in a four hour period.

In one embodiment of this invention, the broadcast channel used by distribution system 100 may be partitioned on a time multiplexed basis. In this embodiment, part of the continuous bandwidth is allocated to a digital file download. User station 106 receives the primary video/audio channel at a reduced rate or resolution, and the balance of the bandwidth is allocated to the streaming digital download to the optically altered optical disc. User station 106 may receive the primary video/audio channel at full bandwidth for one or more continuous portions of time with at least one or more portions of time allocated to full bandwidth digital content delivery to optically altered optical disc 116. For example, a single channel may be utilized to broadcast an entertainment music channel during prime viewing hours, and off peak hours are allocated to content downloading.

In an alternative embodiment, content 112 may be augmented by alternative means including, but not limited to, DOCSIS modems, standard dial up modems (POTS), DSL modems, ISDN modems, limited bandwidth internet bandwidth access, broadband internet access, limited intranet bandwidth access, broadband intranet access, via wire, fiber optic, or wireless technologies.

In an alternative embodiment, user station 106 may store all content transmitted to user station 106 on optically altered optical disc 116 or may autonomously select one or more videos, songs, books, etc. from the content for storage on optically altered optical disc 116.

3. The User Station

Figure 2:
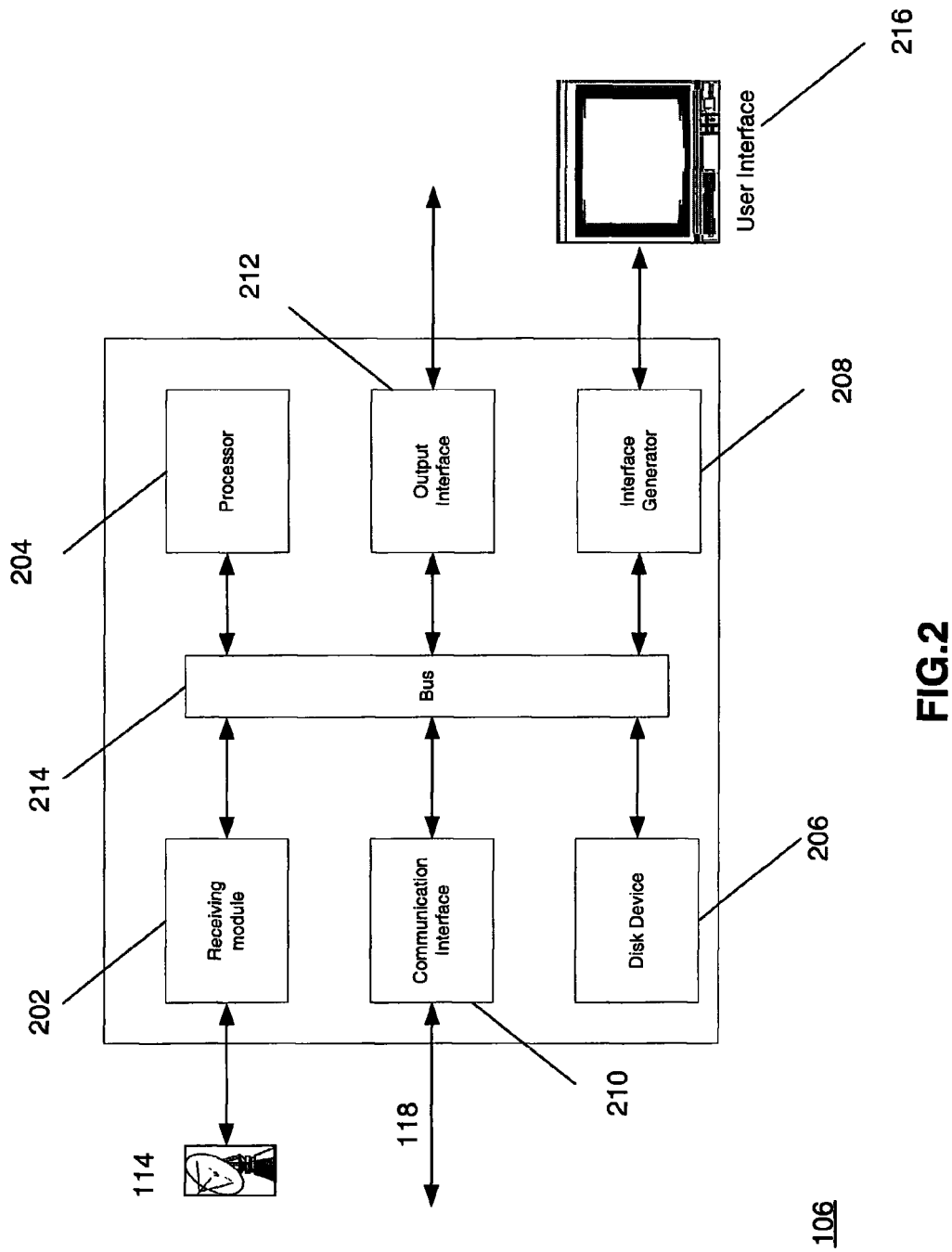
FIG. 2 is a block diagram of a user station, consistent with this invention.

FIG. 1 shows user station 106 for use as an interactive device for receiving and storing content consistent received through distribution system 100. Referring to FIG. 2, user station 106 includes a receiving module 202, a processor 204, a disc device 206, and an interface generator 208. In addition, user station 106 can include a communication interface 210 through which it transmits and receives messages across communication link 118. Furthermore, user station 106 may include an output interface 212.

It should be further appreciated that the term "set top box" is broadly descriptive of any device utilized for the reception and/or transmission of cable and DBS signals or the information contained within those signals. As such user station 106 may take the form of a dedicated consumer device such as set top boxes available from companies such as Pace Micro Technology (of Saltaire, UK), Scientific Atlanta (of Atlanta, Ga.), Motorola (General Instruments), Sagem. In addition, user station 106 and its associated function of Cable or DBS reception and transmission functions may be integrated with one or more functional devices such as DataPlay Players, personal computers, VHS player/recorders, TiVo type player/recorders, DVD player/recorders, CD player/recorders, Web TV type systems, integrated iTV receivers, video game players, video game controllers, integrated remote control stations, and all other forms and manners of integrated home media systems.

In one exemplary embodiment, user station 106 may receive content availability, scheduling, and pricing information via either communication link 118 or dish 104. This information may be displayed to the user via a user interface such as graphical user interface 216. In one embodiment, the user interface by which the user samples, selects and orders content, may be accomplished by interactive television, ITV. In an ITV application the viewer, or customer, has the choice to select clips or songs to be viewed or listened to. Viewer choices may be entered into the system by sensitive areas on the screen that the viewer activates using a TV remote. By moving a cursor to these sensitive areas sampling selections may be made, information about artists may be presented or actual ordering may take place. During interactions with viewers, the screen display may present images that are different from the material shown without an interaction. The ITV is functionally operated by software residing in the cable or DBS set-top box. Commonly assigned U.S. patent application Ser. No. 09/866,765, filed May 30, 2001, entitled "Methods and Apparatus for Interactive Television", incorporated herein by reference, describes an ITV application that can be used consistent with this invention.

After viewing the displayed information, the user may input a selection of one or more songs, videos, books, etc. via user interface 216. In one embodiment, the customer accesses (or navigates) graphical user interface 216 via a hand held remote. In one embodiment, the remote control communicates via infrared LED transmitter to an infrared sensor contained on user station 106. An optional keyboard can be used by the customer to access (or navigate) the graphical user interface via the same infrared sensor contained on the user station.

Upon receipt of the user selection, user station 106 will await the transmission of the selected content. As the selected content is received by dish 114 and receiving module 202, the content is recorded on optically altered optical disc 116 by disc recording device 206. The user may then remove the device for playing on any player capable of reading optically altered optical disc 116. Once recorded, the use station may generate an indication of the user selection and recording of the content and transmit the indication to central controller 102 via communication interface 210 and communication link 118, for billing purposes.

In an alternative embodiment, disc recording device 206 may be external to user station 106. In this embodiment, user station 106 may communicate with disc recording device 206 via output interface 212. Output interface 212 may transmit the received content to optically altered optical disc 116 at real-time at the same bandwidth at which it is received by user station 106. Output interface 212 may communicate with external disc recording device 206 using any one or more of the following connections: a USB connection, a DOCSIS modem, a standard telephone modem, a DSL modem, an ISDN modem, a fiber optic communications link, a wireless connection, and/or a microwave or another form of radio frequency link.

In one embodiment, user station 106 may include a storage device (not sown), such as a hard disc, for fully or partially caching content 112 as it is received. In this embodiment, content may be preselected by the user for temporary storage in the cache or storage device. Once the selected content is transmitted and received by user station 106, the content is stored in the storage device (not shown). In this embodiment, user interface 216 may provide a listing of content stored in the storage device. The user may then select one or more of the stored songs, videos, etc. for writing to optically altered optical disc 116.

Communication link 218 may utilize any one or more of the following communication means: a DOCSIS modem, a standard telephone modem, a DSL modem, an ISDN modem, an Internet connection, a cellular connection, a fiber optic communications link, a wireless connection, a microwave, and any form of radio link.

Content 112 may be encoded using, for example, interlaced coding techniques. Content 112 may include a unique header code that identifies the title of each song, movie, book, etc. The header code may also identify the exact transmission time of each title. The header code, which can contain transmission times, can be digitally communicated to the operating system of user station 102 to prevent unauthorized reception and subsequent duplication of content 112. Additionally, content 112 may be protected using watermarking or anti-piracy schemes such as those described in U.S. patent application Ser. No. 09/493,854 and U.S. Provisional Patent Application No. 60/382,622, which are hereby incorporated by reference in their entireties.

4. Billing

In one embodiment, customers are only billed for content 112 that is actually recorded on optically altered optical disc 116.

Content 112 may be broadcast transmitted to all end consumers simultaneously, or sequentially, either on a subscription basis, a pre-purchase basis, a purchased basis, or a pay-per-play basis. Alternatively, content 112 can be preloaded cached content protected by digital rights management and purchased and/or authorized at a later time. In this way, a user may be billed only for the content that is actually selected and recorded on optically altered optical disc 116.

It is understood that selection of a specific title by the user may require that payment be completed before activation of initial reception and storage of the content, or before content 112 is recorded on optically altered optical disc 116.

In one embodiment, user station 106 may also contain an audio speaker video screen, or other system (not shown) to allow the customer to "preview" content 112 before it is recorded on optically altered optical disc 116 and subsequently paid for. In this embodiment, the user will not be billed until the customer has either accessed the content a set number of times, for example, 3 times, or the customer indicates through user interface 216 (e.g., a graphical user interface) a desired to permanently record it. As an alternative, previewing may be accomplished by playing a highly compressed or low-grade "preview" copy through a speaker or associated system.

5. Disc Recorder Device

Figure 3:
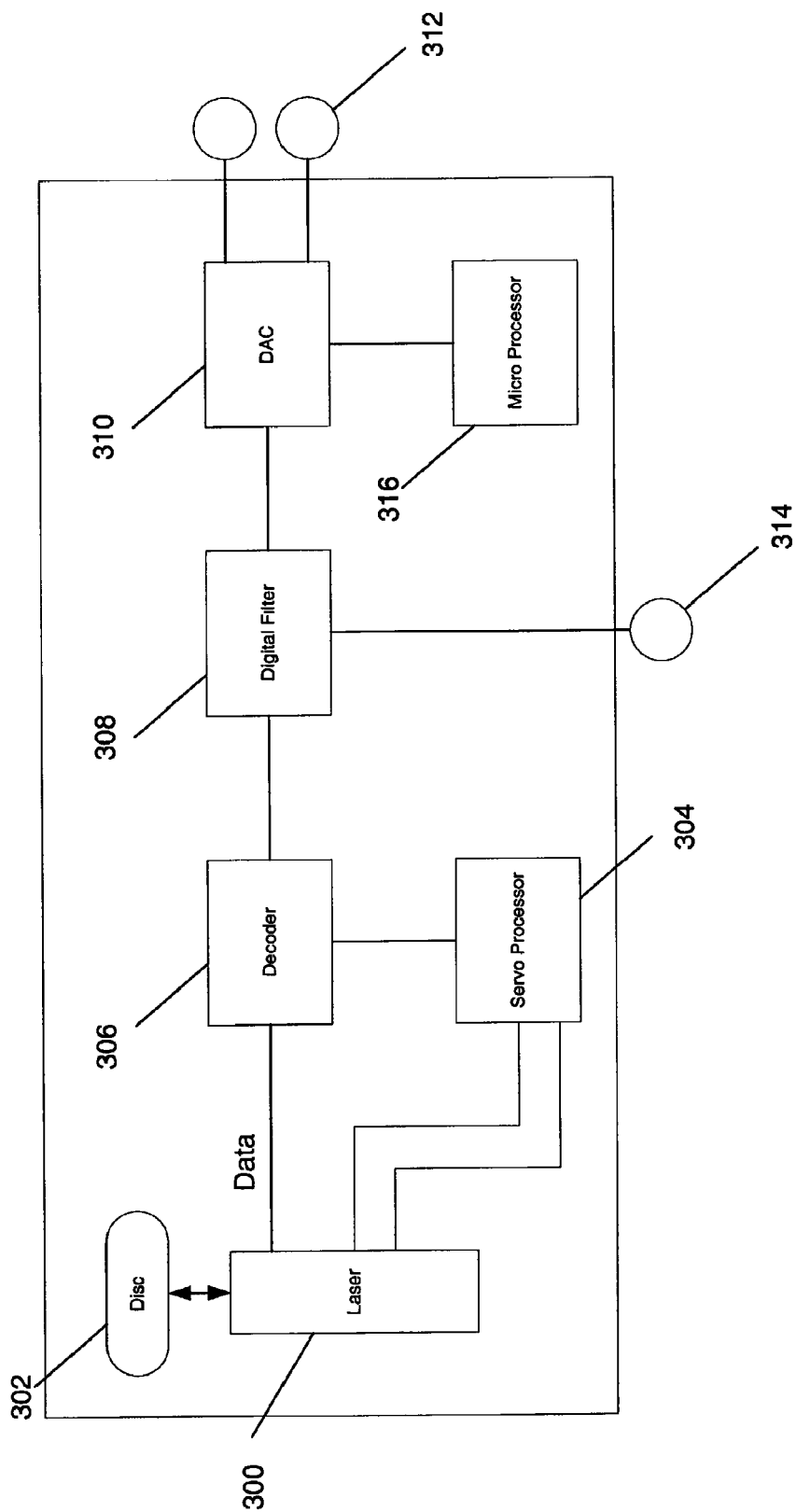
FIG. 3 is a block diagram of a disc recording and/or playback device consistent with this invention.

FIG. 3 shows an exemplary disc device 206 for reading and writing to optical discs. Device 206 includes laser 300 for generating a laser beam (not shown) and directing it to optical disc 302, a servo processor 304, an encoder/decoder 306, a digital filter 308, a Digital-to-Analog (DAC) or Analog to Digital (ADC) Converter 310, analog outputs 312, a digital output 314, and a microprocessor 316. As described below, these components work together in a manner that is similar to conventional devices. The primary improvement is directed to the optical discs themselves, the exact dimensions and operating specifications depend on the optically altered disc. Because the optical disc recording process is similar to the optical disc reading process, we discuss the reading process first.

During reading, disc 302 is scanned by the laser beam generated by laser 300. The laser beam is reflected from the reflective layer to a photo-electric cell within device 206. The cell emits current and a 1 is registered when the light is incident on a land. When the beam shines on a pit, about half of the light is reflected from the surface and half from the depth of the pit. The interference between the two reflected beams substantially reduces the intensity of the original beam. In this case, the photo-electric cell emits no current and a 0 is registered. Laser 30 is kept accurate by servo processor 304. The read data is sent to decoder 306, where it is converted to regular digital information. Digital filter 308 then removes noise. DAC 310 converts the digital data to an analog signal, if desired. After an analog filter (not shown) removes the noise, the signal is sent to outputs 312 for reproduction as, for example, sound. Microprocessor 316 can control features, such as volume, balance, tone, etc.

In addition, disc reader 206 may include additional components to improve output quality. For example, error correction can be used to correct errors in bit reading. In addition, oversampling is a simple, inexpensive device to filter out conversion side effects. Optical discs may also be enhanced by features such as track, time, and index indications. Search, programming, repetition, and random playback are other possibilities. The disc is read on the reflecting side, but the more vulnerable side is the label side.

During a recording process, content can be received from processor 204 of user station 106 via any type of signal, including electrical, optical, etc. If the content is in analog form, the signal is sampled (measured) and recorded on the disc. When the content signal is in digital form, device 206 may simply receive the digital data and record it without significant processing. It will be appreciated that the recording process works in a similar manner to the reading process, however, the power level of laser 300 is increased to alter the reflectivity of the content layer to encode the information.

It will be appreciated that the components shown in FIG. 3 are illustrative only, and can be altered as necessary to read and write in any format that may be desired. For example, decoder/encoder 306, digital filter 308, and DAC/ADC 310 could be reconFIG.d as needed.

6. Optically Altered Optical Disc Technology

Figure 4:
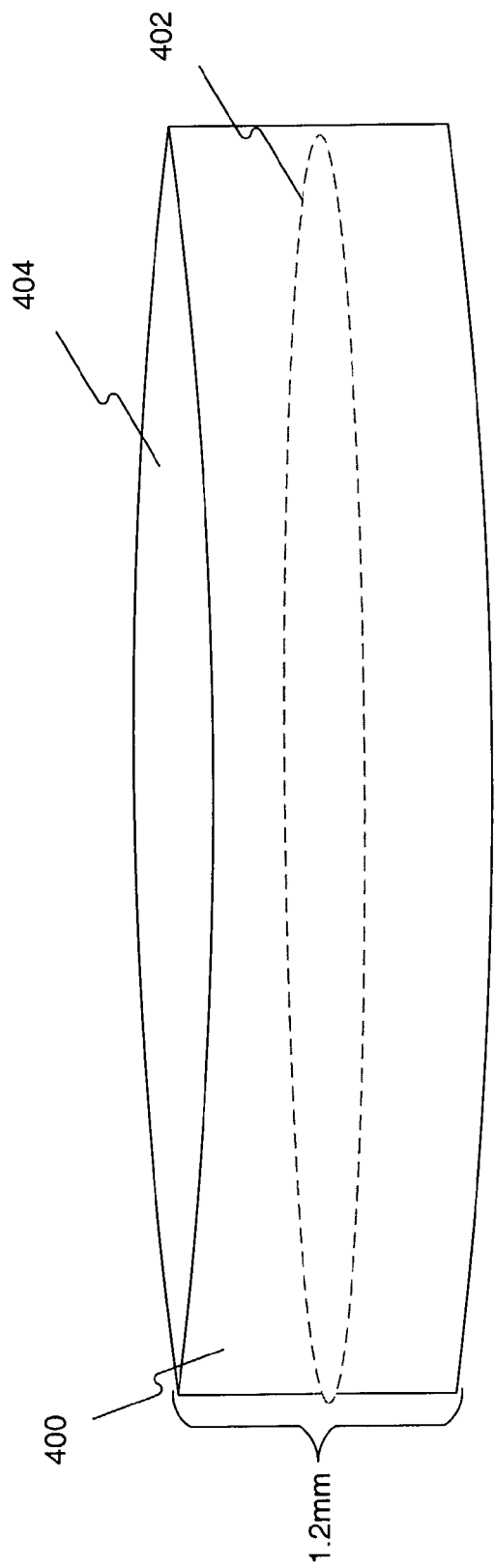
FIG. 4 is a diagram of an optical disc consistent with this invention.

FIG. 4 depicts a traditional optical disc, such as a conventional CD or DVD. A traditional optical disc consists of a transmissive coating 400 and one or more reflective data layers 402. Upon reading the disc, the laser beam is focused on one or more reflective data layers 402 through the disc entrance surface 404.

As used herein, the term "transmission" denotes the percentage of energy passing through an element or system relative to the amount that entered. Similarly, the term "transmittance" is the ratio of the radiant power transmitted by an object to the incident radiant power. Finally, the term "transmissivity" denotes that internal transmittance per unit thickness of the material that forms the object.

Optically altered disc 116 may, in one embodiment also consist of transmissive coating 400, one or more reflective data layers 402, and disc surface 404. However, in optically altered disc 116, transmissive coating 400 is optional. If present, transmissive coating 400 can perform one or more additional features such as optional filtering, anti-reflecting, and a protecting functions. In one embodiment, optically altered optical disc 116 may comprise the reflective data layer 402 and an additional layer on which the reflective content layer is disposed. In this embodiment, the additional layer may be any one or more of (1) an ultraviolet light transmissive layer, (2) an anti-reflective layer disposed on the reflective content layer, (3) an anti-reflective layer, (4) a visible light opaque layer, (5) an optical filter layer, (6) an inorganic material layer having a bandgap greater than about 4.5 eV, (7) a plurality of optically differentiated layers, and (8) an organic layer having a band gap greater than about 3.0 eV.

Consistent with this invention, an optically altered optical disc, such as a DVD (e.g., DVDO™ or DVDOA™) or a CD (e.g., CDO or CDOA), can be created by disc recording device 206 to provide content protection in lieu of or in addition to a traditional DRM schema. As used herein, "optically altered optical discs" cannot be read by optical readers that are compatible with conventional optical discs, such as those defined by ECMA 267 Standard, 3$^{rd}$ Edition, April 2001, which is incorporated herein by reference in its entirety. Therefore, one or more intrinsic optical differences in traditional CD (780 nm) and/or DVD (650/635 nm) read and write technology are implemented to render the reading optically altered optical disc impossible by conventional readers. Thus, consistent with this invention, content can be written to optically altered optical disc 116 in a way that requires a DVDO or CDO player to later view or access the content. Similarly, to record on optically altered optical disc 116, a suitable recorder is required. This approach overcomes the conventional limitations of content distribution, including limitations with the present Digital Rights Management (DRM).

In one embodiment, optically altered optical disc 116 can be formed by applying an optically different coating, for example, a polymer, that facilitates the use of a different optical focal length within the read and write system.

In one embodiment, an adjustable focal length system is utilized to read both legacy DVD and CD discs along with optically altered optical disc type discs. A galvanometer, linear actuator, a piezo actuator, a flexible membrane system (reflective, refractive, or holographic) may be used to adjust the focal length. The focal length may be continuously or periodically variable in synchronous with the disc read/write system. In one embodiment, a dual focal length system is utilized to read/write both legacy DVD and CD discs along with optically altered optical discs.

In another embodiment, the size, shape, or energy spot distribution may be optical altered to provide content protection.

In another embodiment, a dual color optical read/write system is utilized to facilitate both DVDO and CDO discs. In one embodiment, a three color system is utilized to read from and/or write to high capacity DVDO and CDO discs, along with legacy DVD and CD discs (400/410 nm-635/650 nm-780 nm respectively). The three color system provides an immediate and compelling migration path to higher capacity discs utilizing shorter wavelength long life laser diodes (such as 400-410 nanometer (nm) devices). In yet another embodiment, a three color system is used to read from and/or write to high capacity DVDO and CDO discs with shortwave laser diodes, along with legacy DVD and CD discs (400/410 nm-635/650 nm-780 nm respectively).

In one embodiment, a single color system is utilized to read any combination (or subset thereof) of high density DVDO discs HVDO™, high density DVDs (HVD™), high density optically altered CDs (HCDO™), high density CDs, along with legacy DVD and CD type discs. The use of a single color system further facilitates an ultra-low cost, high reliability (minimum component count) system as discussed solving the need within the current art for a system compatible with reading both higher capacity discs utilizing shorter wavelength long life laser diodes (such as 400-410 nm devices) and legacy DVDs and CDs. The choice of color selection is based upon disc compatibility, cost, component availability, and other design and manufacturing parameters:

| ILLUSTRATIVE WAVELENGTH (NM) | DISC TYPES |
| --- | --- |
| 780 | CDO, CD |
| 635/650 | DVDO, DVD, HCDO, HCD, CDO, CD |
| 400/410 | HDVDO, HVD, DVDO, DVD, HCDO, HCD, CDO, CD |

It will be appreciated that the above list is representative and not discrete in wavelength values. Other wavelengths are indeed possible and likely, with the numbers shown as guidelines only. As presented in the related filing shorter wavelengths offer the capability for storage increased density. In addition it is anticipated by the present invention that laser diodes and other optical sources shorter than 400/410 nm (likely in the 200/250 nm range and below) will be available allowing further generations of very high capacity discs, scalable and within the scope of the present invention. The present invention is not limited to any specific optical source or optical system as these are well known within the current and emergent art and are anticipated to evolve. It should be further appreciated that the higher bit densities offer improved read/write data rates.

It should be further noted that the physical diameter or shape of the disc is not limited by the present invention. Indeed both smaller diameter discs (ex: 20-30 mm) and larger diameter discs (e.g., 200 mm) may be utilized. This invention may be used with single or multi-sided discs, multi-layer discs, multiple discs, or any combination thereof.

In one embodiment, optical image recognition processing is applied to the signal emerging from (read) or going to (write) the disc. A single high resolution spot signal is deconvolved from the larger optical image size, (for example 400/410 nm focused laser diode spot image on larger 635/650 nm DVD disc pit). The image deconvolution may be accomplished by analog or digital signal processing based upon shape recognition, single or multiple edge differentiation, or any other appropriate signal processing technique well known in the art.

In another embodiment, an AC coupling of the photodetector(s) is applied to achieve an energy balance system. As the bit stream sinks in (waveform above and below zero reference) only the zero crossings are processed indicating edge or bit transitions. This approach provides for amplitude independence of the optical source and thus accommodates degradation in the laser diode, other optical source, optics, and photodetector responsivity. This effectively counteracts life, aging, temperature variations, stress and other variations/degradation within the system.

In one embodiment, the bit error rate is sensed and the energy to the laser diode, or other optical source is increased to reduce the bit error.

In another embodiment, optical energy impingent of the photodetector is sensed and compared to a threshold or thresholds and the energy to the laser diode, or other optical source is increased to reduce the bit error.

In one embodiment, optical energy impingent of the photodetector is sensed and compared to a threshold or thresholds and the energy to the laser diode, or other optical source is increased to reduce the bit error.

In one embodiment, color selection is utilized to minimize bit error rates and/or autonomously determine disc type.

In one embodiment, the focal length of one or more optical systems is varied around known or determined optimal points to reduce bit error rates.

In yet another aspect of the present invention the optical focal length is varied to maximize, achieve a known level, or a percentage of peak energy on the photodetector.

In yet another aspect of the present invention the color or focal lengths are autonomously varied or searched to determine the type of discs and optimize performance.

In yet another aspect of the present invention, color and focal lengths are synchronously varied to provide content protection.

In one embodiment, a solid state photo spectrometer is used with multiple photodetectors to achieve multi-color reading or writing through single or multiple optical systems with a color variable, or a known fixed, focal length. For example, detectors may be arranged to pickup individual color bands by using optical color filters, coatings, or other means to simultaneously read multiple bits from single or multi-layer images.

In yet another embodiment the present invention the overall system (read/write player) is optimized for optimal life of the optical laser diode or other optical sourced as function of the bit error rate due to optical contamination, misalignment, and other sources along with the disc coating thickness, (optical throughput). In particular by reducing the optical power for read functions (not limited to just read) the system provides for the use of simpler, less complex laser diode structures, that result in lower costs, smaller dies in manufacturing the chip sets which produce higher yields, enhanced reliability, and early time to market.

In yet another aspect of this invention, conventional manufacturing equipment is used with optically differentiated coatings to reduce, or even eliminate, significant additional costs that may be associated with new CD, DVD, and other optical disc product lines. No new extensive investment in process development, manufacturing technology, manufacturing equipment, and related facilities and support is required. Thus content providers trying to mitigate capital investment expenditures and overhead costs will have enjoy a significant benefit. This eliminates those capital/manufacturing problems associated with new generation Dataplay type devices.

Illustrative systems and methods for their use are listed below:

Generation 1

The technology, which may be an optically altered disc technology, is licensed for consumer record/playback devices. A simple device that downloads music, video, or other content onto an OA device for pay-per-play or purchase. For example, videos may be pay-per-play whereas music might be purchased. An existing 635 nm laser diode and optical system may be utilized for the OA function while a second laser diode and optionally a second optical assembly can be used for compatibility with legacy discs.

Generation 1A

Generation 1A includes all of the features listed above for Generation 1, as well as a hard drive for profiling content.

Generation 2

As above, except Generation 2 uses shortwave 400/410 nm laser diodes for reading new generation HVDs and HVDOs. (typically 8x-80 GB). A second 635/650 nm laser diode provides compatibility with legacy discs along with DVDO and CDO type discs. A high transmissivity disc coating in combination with along with contamination control system and bit error correction software are utilized. The optical disc coating provides a robust surface without the dust/contamination issues that are known to plague Dataplay type devices.

Generation 3

As above, except a single 400/410 nm laser diode system with image waveform recognition is utilized to be broadly compatible with HDVDO, HVD, DVDO, DVD, HCDO, HCD, CDO, and CD.

Additional Coating Information

TABLES 1 and 2 include lists of some of the illustrative materials that are suitable for DVDO coatings. The materials may be used individually or in any combination thereof, and can be applied in multiple layers. For example, one or more coatings (or layers) can be applied primarily for focal distance and optical transmissivity properties, while others (such as a hard overcoat) may be applied for structural integrity and/or physical protection. It should also be appreciated that improved optical transmissivities enable higher bit densities and improved read/write data rates with lower bit error rates.

TABLE 1

| Material | Transmission | | |
|---|---|---|---|
| | 635 nm | 400-410 nm | 210-250 nm |
| Indium Tin Oxide (ITO) (300 nm thick) | ~85% | ~73 --> 80% | 0 |
| Polycrystalline fcc TiN Films | ~90% | ~80 --> 84% | 0 --> 8% |
| Nanocrystalline Sb-doped SnO2 (200 nm thick) | ~90% | ~88 --> 90% | ~25 --> 30% |

TABLE 1-continued

| Material | Transmission | | |
|---|---|---|---|
| | 635 nm | 400-410 nm | 210-250 nm |
| CeO2-TiO2 Films calcined @ 450 C. (100 nm thick) (polarized) | ~92% | NA | NA |
| CeO2-TiO2 Films calcined @ 450 C. (100 nm thick) | ~94% | NA | NA |
| TiO2 | NA | ~100% | NA |
| Polyaniline (Emeraldine Base) | ~27% | ~65% | ~36 --> 18% |
| Polyaniline (Emeraldine Salt) | ~65% | ~45% | ~49 --> 42% |
| Polyaniline (Leucoemeraldine Base) | ~89% | ~75% | ~20 --> 18% |
| Poly(3-octylthiophene) | ~55% | ~40% | NA |
| Poly(para-phenylene) | ~79% | ~16% | NA |
| Poly(cyanoterephthalylidenes) | ~83% | ~44 --> 40% | ~63% |
| Poly(ortho-toluidine) | low | very high | NA |
| Amorphous Hydrogenated C (a—C:H) | | | 80% Transparent 500 nm --> 5,000 nm |
| Crystalline Nanoscale Powder SnO2:Sb (ATO) | | | ~90% Transmission in "visible" |
| Al-doped ZnO thin Films | | | ~90% Transmittance in visible |
| Kynar SL (trademark)/Cp-41 (trademark) blends | | | transparent |
| Polyester Acrylate Film Cured with Pinacalone | | | 56% --> 89% transmittance (250-300 nm) |
| Poly(vinylether) Coating (22 micron thick; UV-cured) | | | 97% --> 100% Transmittance (250-400 nm) |
| Poly(trishydroxyphenyl-ethane) [TVE] | | | ~60% Transmittance (635 nm) |

TABLE 2

| Glasses (mixtures of inorganic oxides) | Transmission (1 cm) | |
|---|---|---|
| | 546.1 nm | 310 nm |
| Phosphate Crown | 99.8 | 46 |
| Dense Phosphate Crown | 99.8 | 46 |
| Borosilicate Crown | 99.8 | 35 |
| Crown | 99.8 | 40 |
| Zinc Crown | 99.8 | 27 |
| Barium Crown | 99.7 | 28 |
| Dense Crown | 99.8 | 28 |
| Crown Flint | 99.6 | 49 |
| Barium Light Flint | 99.8 | 1 |
| Extra Dense Crown | 99.8 | 1 |
| Extra Light Flint | 99.7 | 17 |
| Barium Flint | 99.7 | 32 |
| Light Flint | 99.8 | 0.4 |
| Flint | 99.8 | 0.8 |
| Dense Barium Flint | 99.8 | 0 |
| Dense Flint | 99.7 | 12 |
| Short Flint | | |

Materials with a large band gap (e.g., about 4-5 eV or larger) allow optical transmission in the ultraviolet portion of the electromagnetic spectrum (e.g., wavelengths less than about 400 nm, especially wavelengths less than about 350 nm). Organic materials (e.g. polymers) typically have band gaps of 3.5 eV or smaller, due to the energy of the electronic excitations of sp2 and sp3-bonded carbon. Large band gaps are typically found only in inorganic materials, especially oxides, nitrides, fluorides, and some carbides. Examples of such materials include: BeO, B2O3, MgO, Al2O3, SiO2, CaO, Cr2O3, GeO2, SrO, Y2O3, ZrO2, BaO2, CeO2, HfO2, BN, AlN, Si3N4, MgF2, CaF2, SrF2, BaF2, C (diamond), SiC Mixtures of these compounds (e.g. AlxOyNz, YxZryOz) can also be used, which allows tuning of the physical characteristics (processability, hardness, hygroscopicity, etc.). Materials of this sort are used in UV photolithography.

Recent advances in wide energy bandgap light emitting devices based upon materials such as III-V Indium Gallium Nitride (InGaN) and its related compounds including InGaAs grown on materials such as Silicon Carbide (SiC) will enable short wave laser (approximately 410 nm through UV) diodes to operate with long lifetimes at room temperatures. While competing technologies such as blue lasers based upon II-VI compounds such as Zinc Selenide (ZnSe) are possible, they have shown lifetimes far too short to be of commercial viability. Further frequency doubling to achieve short wavelengths is still too costly for deployment in typical consumer devices. Both GaN and SiC (6H-4H) materials demonstrate a multiplicity of highly desirable properties including a wide energy bandgaps, thus enabling high temperature operation without intrinsic conduction—enabling the emission and detection of short wavelength light—and the advent of short wavelength laser diodes.

In addition, as a substrate, SiC has a high breakdown voltage of approximately 2.4 megavolts/cm and high electron drift velocity of approximately $2.0 \times 10^7$ cm/sec at $E \geq 2(10^5)$ V/cm, additionally SiC is an excellent thermal conductor approximately (3.8 W/cm-° Kelvin). Additional short wavelength/UV laser diode technologies may include the use of InGaN grown on single crystal $Al_2O_3$, with or without a buffer layer, single crystal GaN or AlN and their related compounds grown or deposited on AlN, SiC, $Al_2O_3$ with or without buffer layers. Buffer layers may be included to promote a closer lattice and thermal coefficient of expansion match. It should be noted that the present invention is not limited to any specific implementation or any subset of implementations of a short wavelength or UV laser diodes.

It should be clearly noted that the present invention applies to all wavelengths shorter than 635 nm and is not restricted to blue, UV, or any other operating range.

In one embodiment of the present invention a short wave laser diode is operated at a reduced power dissipation level to dramatically increase laser diode life and reliability through the use of reduced optical spot size, allowing commensurately smaller "pits" and track to track spacing. For example by simply reducing the image spot size from CD technology 780 nm technology and DVD (best case 635 nm technology) we achieve a commensurate bit density gains of approximately $(780^2/405^2)=3.7:1$ over standard CD-DA technology and $(635^2/405^2)=2.46:1$ better than standard DVD-ROM technology. Short wavelength laser diodes including UV devices based upon high energy bandgap materials have an even greater advantage, for example we achieve $(780^2/210^2)=13.8:1$ over standard CD-DA technology and $(635^2/210^2)=9.14:1$ better than standard DVD-ROM technology.

In one embodiment, reductions in spot image size (area) allow a near exponential decrease in power dissipation and full exponential increase in reliability and lifetime. In specific a laser diode failures rate $\lambda$ (failures per thousands of hours) is directly related to junction power dissipation, thermal mismatch of materials including buffer layer, bonding pads, bonding wires, and case materials. For reference the mean time between failure of a laser diode may be calculated as $1/\lambda$ and the probability of successful operation for a given time period as $e^{-\lambda t}$ where t is total active operational time in hours. By reducing the image spot area with short wave or UV wavelengths, the use of these laser diodes is now possibly through the aforestated power reductions. Reliability and associated laser diode lifetimes are increased to a level that makes deployment of these laser diodes practical in home consumer devices—a function of cost, reliability, and lowered power consumption.

In another embodiment of the present invention a short wavelength laser diode is employed to greatly increase the bit density of a digital disc storage device, improve reliability of the of the read/write function with a higher signal to noise ratio, (resulting in a lower bit error rate), yield a higher bandwidth bit output rate, or any achievable combination thereof. Application of our short wave laser diode yields a bit density improvement of 2.46:1, providing a side/single layer 12 cm diameter disc of 11.56 billon bytes, (17.22 million bits/mm$^2$). A double sided, double layer 12 cm disc with a short wave laser diode similarly offers 41.82 billion bytes (31.15 million bits/mm$^2$).

In one embodiment, the use of a UV laser diode has an even more profound bit density benefit of 9.14:1 providing a side/single layer 12 cm diameter disc of 42.96 billon bytes, (63.98 million bits/mm$^2$). A double sided, double layer 12 cm disc with a UV laser diode similarly offers 382.23 billion bytes (115.74 million bits/mm$^2$).

In one embodiment, the increased bit densities from short wave laser diodes are utilized to increase output bandwidth. Assuming the present industry standard circular linear velocity read rate of 3.84 m/sec, the improved bit density from a short wave laser diode provides an increase in output bandwidth to 2.17 megabytes/second, an improvement of 1.57:1. Improved signal to noise also accommodate higher multiples n*X of linear velocity read rates and commensurate increases in output data bandwidth.

In one embodiment, the increased bit densities from UV wave laser diodes are utilized to increase output bandwidth. Assuming the present industry standard circular linear velocity read rate of 3.84 m/sec, the improved bit density from a UV laser diode provides an increase in output bandwidth to 4.19 megabytes/second, an improvement of 3.02:1. Improved signal to noise also accommodates higher multiples n*X of linear velocity read rates and commensurate increases in output data bandwidth.

In one embodiment, the reduced power consumption of the short wave or UV laser diode is exploited to increase the lifetime of battery powered portable or fixed recorders/players, and/or reduce the size and complexity of power supplies employed within these recorders/players.

In yet another embodiment one or more a SiC photodetectors are employed to improve signal to noise through a lower noise spectral density and or improved responsivity (conversion of photons to photoelectrons). SiC photodetectors have ultra high quantum efficiency (the ratio of conversion of impinged photons to photoelectrons) and an extremely low noise spectral density comprised of dark current (essentially shot, Johnson, and excess noise). By allowing down to single photon counting at room temperature SiC photodetectors have the ability to facilitate further reductions in laser diode emitter power and ultra high bandwidth read technologies with low capacitance devices, utilized with read bandwidth enhancement circuitry (high frequency boost amplification).

In one embodiment, reading and writing non-coated surfaces and or antireflection coated discs substantially increases signal to noise of encoded discs by reducing losses within the system. Further the non-coated surfaces are substantially thinner substrates that have an inherent advantage in reliability as they are less susceptible to errors in tilt.

In one embodiment, atomic thickness or ultra thin short wave/UV transparent and resistive coatings are employed to protect recorded or ROM discs from contamination. Any short wave/UV hard overcoat materials such as, but not limited to, Silicon Dioxide $SiO_2$ and Manganese Fluoride $MgF_2$ may be employed. These coatings may be deposited or applied by any conventional coating technology.

In another embodiment, a short wave/UV transparent and resistive polymer is employed to protect recorded or ROM discs from contamination. In one embodiment, the uncoated disc is place in a protective housing, and is inserted into the playing device fully protected to reduce exposure to harmful contamination.

In another embodiment, multiple photodetectors are employed to simultaneously read multiple tracks. A combination buffer multiplexor system is employed to recombine the tracks to yield an ultrahigh output bit rate bandwidth.

In one embodiment, either the proprietary nature of the short wave laser diode, improved track resolution, read/write mechanism, and self-contained decoding mechanism, or any combination thereof is employed as an anti-piracy device. The barriers created by creating a proprietary and/or patented technology, controlling the supply of short wave/UV laser diodes, and or any components therein comprises a highly effective mechanism for limiting piracy since all decoding and key enabling technologies may be integrated into self contained, tamper resistive, packaging.

In one embodiment, the high density disc is utilized in whole or in part with an encryption, digital rights management, or other keying system, with an access code entered by any means, to unlock pre-stored content on the discs for pay per play or purchase.

In one embodiment, short wave and/or UV laser diodes are employed with "near field" ROM and/or "near field" read/write discs to provide commensurate bit density improvements, output bandwidth improvements, increased component reliability, reduced power consumption, or any combination thereof.

In one embodiment, collimating lenses of any type, standard, aspheric, fresnel, or holographic are utilized to improve the energy gathering and delivery from the short wave or UV laser diode. In addition the collimation provides for a near distance insensitive delivery of energy to a fixed or movable lens, lens assembly, or lens array for focus adjust. Focus adjust may be for accommodating of legacy (CD, DVD, or DataPlay) media types devices in a single player/recorder.

In one embodiment, a closed loop feedback system is employed to optimize the focus of the optical spot, dynamically optimizing signal to noise to account for both instantaneous and long-term system misalignments.

In one embodiment, a diffuser of any type, preferentially of crossed arrays of micro cylindrical lenses are utilize to provide uniform energy to a focusing lens, lenses, or lens array—offering a more uniform energy spot.

In one embodiment, a spatial encoder mask on the laser diode source optics is utilized in conjunction with photodiode read array to increase signal to noise ratios and/or facilitate the simultaneous read of multiple tracks.

In one embodiment, laser diode or other optical source power consumption levels are brought to a minimum by utilizing highly transparent short wave and/or UV transparent materials for protection of disc surfaces. For compatibility with legacy CD, DVD and DataPlay-type technologies the protective coating materials may also be highly transmissive in the longer wavelength region. Below is a non-exhaustive list of many materials useful for the present invention. It should be noted that the present invention is not limited to the materials listed, but rather may be any type of highly transmissive inorganic or organic material, natural or synthetic, with or without coatings to reduce surface reflectivity, otherwise enhance transmissivity, or reduce absorption. Coatings may consist of single materials or multi-layer coatings such as those composed of dielectric materials. Also listed below is a non-exhaustive list of many materials available for enhancement coatings. It should again be noted that the list is representative, and the present invention applies to any coatings which reduce losses within the optical system or disc coating. For example, by applying the protective, highly transmissive materials and/or coatings to DataPlay devices, the pit and land surfaces become fully protected, making them highly impervious to damage by handling and contamination. The application of protective materials and/or coatings may consist of chemical vapor deposition, photoresist etching, hot melt adhesion, injection molding, sputtering, photopolymers, deposition, ion assisted deposition, organic growth, or any other appropriate method of application. In addition the encoded disc may be manufactured from the protective material directly, as design and/or manufacturing requirements dictate.

In one embodiment, the power level of the optical short wave or UV laser diode is reduced via the use of a highly transmissive optical protective coating. By reducing the requisite optical power, laser diode reliability is increased dramatically. Indeed the application of the protective highly transmissive coating, is enabling of high density discs by allowing emergent short wave laser diodes to have lifetimes compatible with consumer product applications (10,000 to 100,000+hours mean time between failures MTBF)

In one embodiment, the protective highly transmissive coating eliminates the need for a protective housing for the data surfaces, as used in DataPlay devices. By eliminating the need for a housing, moveable mechanical assemblies are not required. This enhances reliability by providing a disc system without moving parts, eliminating any wear and tear effects, and greatly increases robustness with respect to handling and environmental issues. the elimination of the protective housing reduces cost and complexity to the manufacturing processes, non recurring design, tooling costs, and per item manufacturing costs.

In one embodiment, a highly transmissive protective coating or coatings are applied to the data encoding surfaces. By moving the surface of the disc away from the encoded data pits, the surface of the disc is able to be away from the focal plane of the read or write optical beam, thus the effect of any contamination residing on the surface of the disc is significantly reduced, or in most practical scenarios, effectively eliminated. Since the data pits are never exposed to the external environment, this approach far exceeds that found in DataPlay discs which are highly susceptible to contamination or humidity. As previously stated contamination is cumulative over the life of the disc and contaminants from one DataPlay player may be deposited within another player by utilizing a disc or discs within multiple players.

In one embodiment, laser diodes with wavelengths shorter than 635 nm are utilized to increase the data density of DVD and DataPlay type discs with applied highly transmissive protective coatings. For example, the use of emergent short wave "blue" laser 405 nm diodes coupled with increased linear bit and track-to-track densities. Once again, the use of the coatings will facilitate moving the surface of the disc away from the encoded data pits, the surface of the disc is able to be away from the focal point of the read or write optical beam, thus the effect of any contamination residing on the surface of the disc is significantly reduced, or in most practical scenarios, effectively eliminated. Particulate matter, condensation molecules, and other forms of contamination will not introduce significant quantities of additional multi-bit errors—thus more sophisticated error correction techniques will not be required. For a given size and efficacy of a given contaminant, the number of successive bit errors will not be increased as the corresponding bit densities increase, thus the user will gain at least a proportionate amount of user data in relation to the increased track and bit density.

In one embodiment, laser diodes with wavelengths shorter than 635 nm and highly reduced power consumption are utilized to increase the data density of DVD and DataPlay type discs with applied highly transmissive protective coatings. For example, the use of emergent short wave "blue" laser 405 nm diodes coupled with increased linear bit and track-to-track densities. Once again, the use of the coatings will facilitate moving the surface of the disc away from the encoded data pits, the surface of the disc is able to be away from the focal point of the read or write optical beam, thus the effect of any contamination residing on the surface of the disc is significantly reduced, or in most practical scenarios, effectively eliminated. The reduction of errors allows a reduced optical power on the disc surface with an acceptable bit error rate.

In one embodiment, a highly transmissive protective coating is applied to the encoded data surface where the thickness of the protective surface is optimized to minimize overall bit error rates as a function of contaminants, tilt, spot beam focus, and transmitted/collected optical power. This is done by calculating and/or measuring bit error rate functions as a function of expected contaminant density, expected tilts due to manufacturing tolerances, aging, wear, and handling, along with optical aberrations and other effects which may cause spatial aliasing/boundary overrun effects over given bits or bit patterns of interest. The solution may be found in closed form by aggregating the functions, differentiating, and setting the result to zero to find absolute and/or relative minima. This solution may also be calculated by various forms of state space search or by calculating and varying sensitivity parameters. It is anticipated that practical constraints, cost goals or limitations, and desired boundary conditions may also be applied.

In one embodiment, highly transmissive short wave and or UV optical materials and coatings are utilized in the optical read/write path to reduce losses within the system, thus reducing the requisite optical power output from the short wave or UV laser diode or optical source.

In yet another aspect of the present invention broadband coatings and or optical materials are utilized for compatibility with legacy CD and DVD type devices along with legacy laser diodes and short wave or UV high density laser diodes and high density discs.

In yet another aspect of the present invention multiple narrowband optical coatings and or optical materials are utilized for compatibility with legacy CD and DVD type devices along with legacy laser diodes and short wave or UV high density laser diodes and high density discs.

In yet another aspect of the present invention a hybrid combination of broadband and narrow band optical components are utilized for compatibility with legacy CD and DVD type devices along with legacy laser diodes and short wave or UV high density laser diodes and high density discs.

In yet another aspect of the present invention a hybrid combination of tunable broadband and narrow band optical components are utilized for compatibility with legacy CD and DVD type devices along with legacy and short wave or UV high density laser diodes and high density.

In yet another aspect of the present invention a hybrid combination of tunable broadband and narrow band optical components are utilized for compatibility with legacy CD and DVD type devices along with tunable laser diodes operating in multiple spectral bands including blue/UV and high density discs In yet another aspect of the present invention broadband coatings and or optical materials are utilized for compatibility with legacy CD and DVD type devices along with tunable laser diodes including short wave or UV high and high density discs.

In one embodiment, either the proprietary nature of the short wave laser diode, UV laser diode, improved track resolution, read/write mechanism, and self-contained decoding mechanism, or any combination thereof is employed as an anti-piracy device. The barriers created by creating a proprietary and/or patented technology, controlling the supply of short wave/UV laser diodes, and or any components therein comprises a highly effective mechanism for limiting piracy since all decoding and key enabling technologies may be integrated into self contained, tamper resistive, packaging.

TABLES 3 and 3A list several physical characteristics of commonly used plastics that meet or exceed the requirements of the present invention. This list is not exhaustive, but instead shows a variety of optical materials available for optical surface coatings, disc protection, the disc substrate itself, housing windows for hermetically sealed disc assemblies in protective housings, and short wave/UV optical materials. For example, two readily-available polymers with large optical gaps (and thus high transmissivity at 408 nm) are poly(vinyl chloride) or PVC, with an optical gap of 3.29 eV (377 nm); and poly(methyl methacrylate) or PMMA, with an optical gap of 3.55 eV (349 nm). Perfluorinated forms of PMMA can have even larger gaps, and thus higher transmission in the blue. PMMA and its derivatives are commonly used to make polymer optical fibers.

TABLE 3

| Refractive index, n | Units | Acrylic Polymethyl Methacrylate (Lucite) (Plexiglass) | Styrene Polystyrene (Dylene) (Styron) (Lustrex) | NAS ® Methyl Mathacrylate Styrene Copolymer | SAN Styrene Acrylonitrile (Lustran) (Tyril) |
|---|---|---|---|---|---|
| $n_d$ (587.6 nm) | | 1.492 | 1.590 | 1.533-1.567 | 1.567-1.571 |
| $n_c$ (656.3 nm) | | 1.489 | 1.585 | 1.558 | 1.563 |
| $n_t$ (486.1 nm) | | 1.498 | 1.604 | 1.575 | 1.578 |
| Abbe Value, $V_d$ | | 57.4 | 31.1 | 35 | 37.8 |
| Rate of change in index with temperature | dn/dt × $10^5$/° C. | −10.5 | −14.0 | −14.0 | −11.0 |
| Coefficient of linear expansion | cm/cm × $10^5$/° C. | 6.74 @ 70° C. | 6.0-8.0 | | 6.5-6.7 |
| Deflection temperature | | | | | |
| 3.6° F./min 264 psi | ° C. | 92 | 82 | | 99-104 |
| 3.6° F./min 66 psi | ° C. | 101 | 110 | | 100 |
| Recommended max. cont. service temp. | ° C. | 92 | 82 | 93 | 79-88 |
| Thermal conductivity | cal/sec-cm ° C. × 10-4 | 4.96 | 2.4-3.3 | 4.5 | 2.9 |
| Haze | % | 2 | 3 | 3 | 3 |
| Uncoated transmittance | %, thickness 3.175 mm | 92 | 88 | 99 | 88 |
| Water absorption | %, immersed 24 h @ 23° C. | 0.3 | 0.2 | 0.15 | 0.2-0.35 |
| Advantages | | | Transmission | High Index | Good index range | Stable |

Uncoated luminous transmittance 79%, thickness 6.35 mm; 90.6%, thickness 0.381 mm.

TABLE 3A

| Refractive index, n | Units | Polycarbonate (Lexan) (Merlon) | TPX Methylpentene (TPX) | ABS | Nylon |
|---|---|---|---|---|---|
| $n_d$ (587.6 nm) | | 1.585 | 1.467 | 1.538 | 1.535 |
| $n_c$ (656.3 nm) | | 1.580 | 1.464 | | |
| $n_f$ (486.1 nm) | | 1.599 | 1.473 | | |
| Abbe Value, $V_d$ | | 29.9 | 51.9 | | |
| Rate of change in index with temperature | dn/dt × $10^5$/° C. | −10.7 to −14.3 | | | |
| Coeffieient of linear expansion | cm/cm × $10^5$/° C. | 6.6-7.0 | | 0.83 | 6.8 |
| Deflection temperature | | | | | |
| 3.6° F./min 264 psi | ° C. | 142 | | 90 | 124 |
| 3.6° F./min 66 psi | ° C. | 146 | | 84 | 140 |
| Recommended max. cont. service temp. | ° C. | 124 | | | 82 |
| Thermal conductivity | cal/sec-cm ° C. × 10-4 | 4.65 | 4.0 | | 5.0 |
| Haze | % | 3 | 5 | 12 | 7 |
| Uncoated transmittance | %, thickness 3.175 mm | 89 | 90 | 79-90.6° | 88 |
| Water absorption | %, immersed 24 h @ 23° C. | 0.15 | | | 3.3 |
| Advantages | | Impact strength | Chemical resistance | Durable | Chemical resistance |

Uncoated luminous transmittance 79%, thickness 6.35 mm; 90.6%, thickness 0.381 mm.

Figure 5:
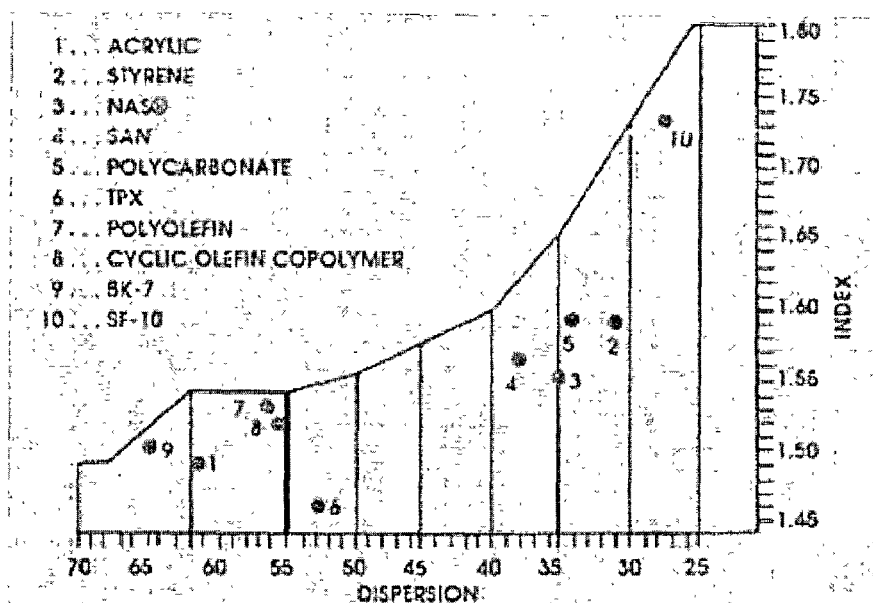
FIG. 5 is a chart showing the index and dispersion data for ten optical plastics consistent with this invention.
Figure 6:
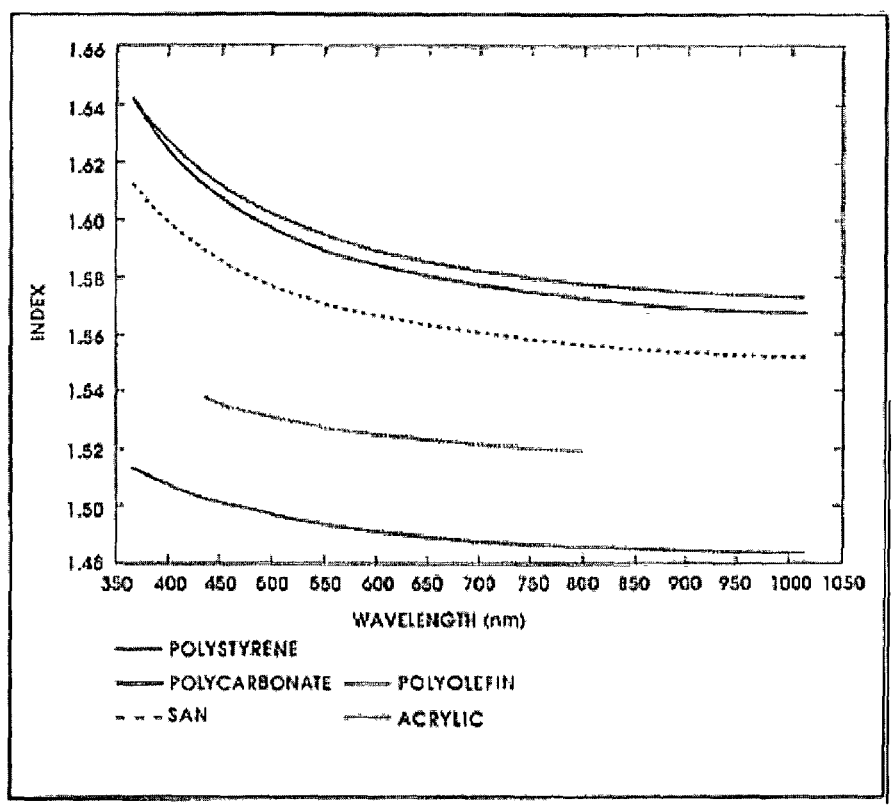
FIG. 6 is a glass map showing the index of refraction and wavelength for several optical plastics consistent with this invention.

It should be noted that various plastics manufacturers specify refractive index to the third or fourth decimal place. Coefficients for a Laurent series expansion of index interpolation (often called the Schott formula) are shown in TABLE 4. FIG. 5 is a glass map showing the refractive index and Abbe dispersion number of ten optical plastics. FIG. 6 is a chart showing the index and dispersion data for ten optical plastics consistent with this invention.

TABLE 4

| Coef | Acrylic | Polystyrene | Polycarbonate | SAN | Polyolefin |
|---|---|---|---|---|---|
| $A_0$ | 2.185936 | 2.445984 | 2.428386 | 2.38687 | 2.212154 |
| $A_1$ | 8.0 $10^{-6}$ | 2.2 $10^{-5}$ | −3.9 $10^{-5}$ | −1.231 $10^{-3}$ | 4.8611 $10^{-2}$ |
| $A_2$ | 1.45315 $10^{-2}$ | 2.72989 $10^{-2}$ | 2.87574 $10^{-2}$ | 2.2946810$^{-2}$ | 5.18744410$^{-2}$ |
| $A_3$ | −5.6315 $10^{-4}$ | 3.0121 $10^{-4}$ | −1.979 $10^{-4}$ | 3.6981 $10^{-4}$ | −8.0382 $10^{-3}$ |
| $A_4$ | 9.4903 $10^{-5}$ | 8.8893 $10^{-5}$ | 1.48359 $10^{-4}$ | 2.6758 $10^{-5}$ | 6.100 $10^{-4}$ |
| $A_5$ | −3.9023 $10^{-6}$ | −1.7571 $10^{-6}$ | 1.3865 $10^{-6}$ | 2.848 $10^{-6}$ | 2.9862 $10^{-6}$ |

$n^2(\lambda) = A_0 + A_1\lambda^2 + A_2\lambda^{-2} + A_3\lambda^{-4} + A_4\lambda^{-6} + A_5\lambda^{-8}$ ($\lambda$ in microns)
(365 nm < $\lambda$ < 1014 nm except for Polyolefin) (435 < $\lambda$ < 830 nm for Polyolefin)

Polymethyl methacrylate (PMMA)—Acrylic is the most commonly used optical plastic. Because its refractive index and dispersion values (FIG. 5) are similar to those of common crown glasses (particularly BK 7), acrylic is referred to as the crown of optical plastics. Acrylic is moderately priced, easily molded, scratch resistant and not very water absorptive. It also has a relatively high transmission. Additives to acrylic (as well as to several other plastics) considerably improve its ultraviolet transmittance and stability.

Styrene—Because styrene has a higher index and a lower numerical dispersion value than other plastics, it is often used as the flint element in color-corrected plastic optical systems. Polystyrene is a low-cost material with excellent molding properties. Compared with acrylic, styrene has lower transmission in the UV portion of the spectrum and is a softer material. Because its surface is less durable, styrene is more typically used in non-exposed areas of a lens system.

Methyl methacrylate styrene (NAS)—This copolymer material consists of 70 percent acrylic and 30 percent styrene. The specific blend ratio affects the material's refractive index, which ranges from 1.533 to 1.567.

Polycarbonate—This plastic is very similar to styrene in terms of such optical properties as transmission, refractive index and dispersion. Polycarbonate, however, has a much broader operating temperature band of −137 to 120° C. For this reason, it is the flint material of choice for systems that are required to withstand severe thermal conditions. Additionally, the high impact resistance of polycarbonate is its strongest advantage. For that reason, safety glasses and systems requiring durability often employ polycarbonate.

Cyclic olefin copolymer (COC)—Cyclic olefin copolymer provides a high temperature alternative to acrylic. Its refractive index is 1.530, Abbe number is 56, and its heat distortion temperature (at 264 PSI) is rated at 123° C. (about 30° C. higher than acrylic). The material has a similar transmittance (92 percent through a 3-mm sample) and a similar differential coefficient of index (with temperature −13×10$^{-5}$/° C.) to that of acrylic.

In addition to polymers that have good to excellent optical properties in the short wave and UV, many more traditional optical materials also exhibit properties that make them useful for the present invention as protective disc coatings, disc substrate material, low loss optics, and optical windows.

Calcium fluoride ($CaF_2$)—a cubic single-crystal material, has widespread applications in the ultraviolet and infrared spectra. CaF$_2$ is an ideal material for use with excimer lasers. It can be manufactured into windows, lenses, prisms, and mirror substrates.

CaF$_2$—transmits over the spectral range of about 130 nm to 10 mm as shown in FIG. 1 below. Traditionally, it has been used primarily in the infrared, rather than in the ultraviolet. CaF$_2$ occurs naturally and can be mined. It is also produced synthetically using the Stockbarger method, which is a time- and energy-consuming process. Unfortunately, achieving acceptable deep ultraviolet transmission and damage resistance in CaF$_2$ requires much greater material purity than in the infrared, and it completely eliminates the possibility of using mined material.

To meet the need for improved component lifetime and transmission at 193 nm and below, manufacturers have introduced a variety of inspection and processing methods to identify and remove various impurities at all stages of the production process, from incoming materials through crystallization. The needs for improved material homogeneity and stress birefringence have also caused producers to make alterations to the traditional Stockbarger approach. These changes allow tighter temperature control during crystal growth, as well as better regulation of vacuum and annealing process parameters.

Figure 7:
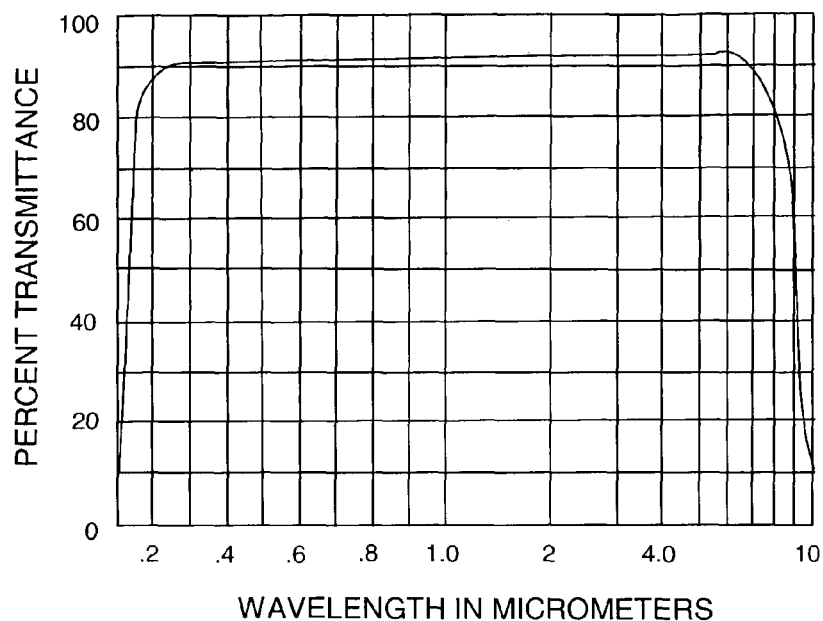
FIG. 7 is a graph showing the properties of excimer grade CaF2 consistent with this invention.

Excimer-grade CaF$_2$—provides the combination of deep ultraviolet transmission (for 193 nm and even 157 nm), high damage threshold, resistance to color center formation, low fluorescence, high homogeneity, and low stress birefringence characteristics required for the most demanding deep ultraviolet applications. Relevant properties of the Excimer grade CaF2 are listed in TABLE 5, and shown in FIG. 7.

TABLE 5

| | |
|---|---|
| Index of Refraction (@587.6 nm): | 1.433 |
| dN/dT | $-10.6 \times 10^{-6}/°$ C. |
| Density (gm/cm$^3$) | 3.18 |
| Coefficient of Linear Expansion (+20° to +60°): | $18.9 \times 10^{-6}/°$ C. |
| Meting Point (° C.): | 1360 |
| Young's Modulus (psi): | $1.75 \times 10^7$ |
| Poisson's Ratio: | 0.26 |

Synthetic Fused Silica—Synthetic fused silica is an ideal optical material for many applications. It is transparent over a wide spectral range, has a low coefficient of thermal expansion, and is resistant to scratching and thermal shock. Its transmission is excellent from the ultraviolet to the near infrared.

Figure 8:
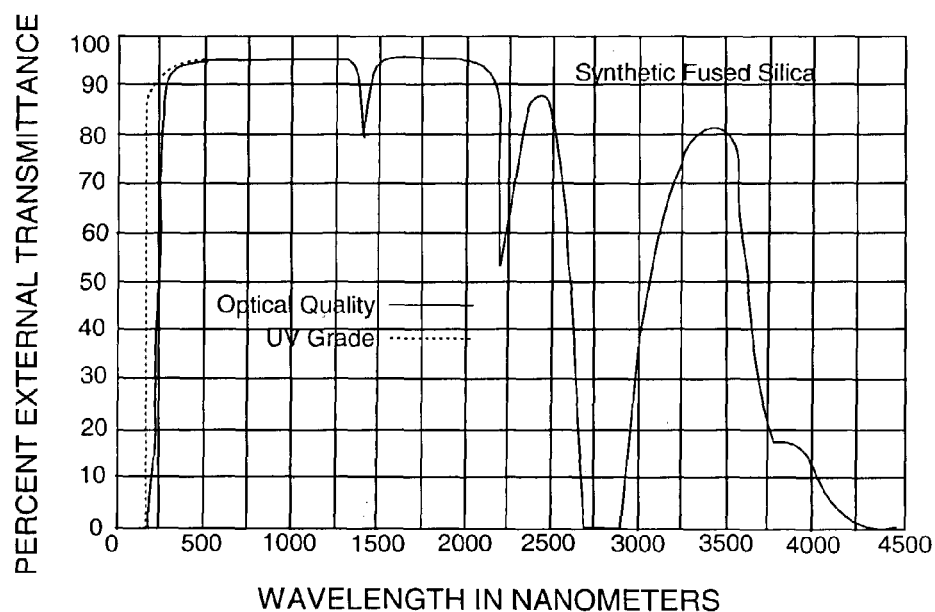
FIG. 8 is a graph showing the properties of synthetic fused silica consistent with this invention.

There are two grades of synthetic fused silica: optical quality (OQSFS) and UV-grade (UVGSFS). UVGSFS is selected to offer the highest transmission, especially in the deep ultraviolet, and very low fluorescence. UV-grade synthetic fused silica does not fluoresce in response to wavelengths longer than 290 nm. FIG. 8 and TABLE 6 provide additional detail about the properties of synthetic fused silica.

TABLE 6

| | |
|---|---|
| Index of Refraction (@587.6 nm): | 1.45846 |
| Abbé Factor (v$_d$): | 67.8 |
| Density (gm/cm$^3$) | 2.20 |
| Coefficient of Thermal Expansion | $5.5 \times 10^{-7}/°$ C. |
| Maximum Operating Temperature (° C.): | 900 |

Figure 9:
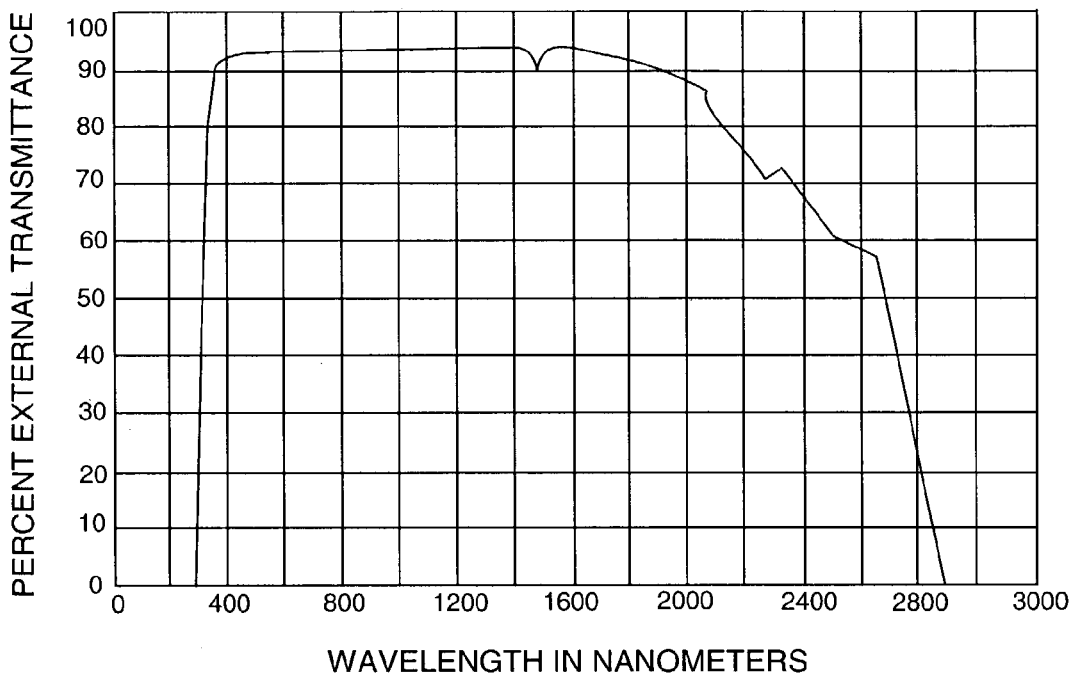
FIG. 9 is a graph showing the relevant properties of BK7 consistent with this invention.

BK7—BK7 is a borosilicate crown glass that is used extensively for lenses, windows, and mirror substrates. It is relatively hard, does not scratch easily, and performs well in chemical tests. It also has excellent transmittance, as low as 350 nm. FIG. 9 and TABLE 7 provide additional detail about the properties of BK7.

TABLE 7

| | |
|---|---|
| Index of Refraction (@587.6 nm): | 1.51680 |
| Abbé Factor (v$_d$): | 64.17 |
| Density (gm/cm$^3$) | 2.51 |
| Coefficient of Linear Expansion (−30° to +70°): | $7.1 \times 10^{-6}/°$ C. |
| Coefficient of Linear Expansion (+20° to +300°): | $8.3 \times 10^{-6}/°$ C. |
| Transformation Temperature (° C.): | 557 |
| Young's Modulus (dynes/mm$^2$): | $8.20 \times 10^9$ |
| Climate Resistance: | 2 |
| Stain Resistance: | 0 |
| Acid Resistance: | 1.0 |
| Alkali Resistance: | 2.0 |
| Phosphate Resistance: | 2.3 |
| Knoop Hardness: | 610 |
| Poisson's Ratio: | 0.206 |

Figure 10:
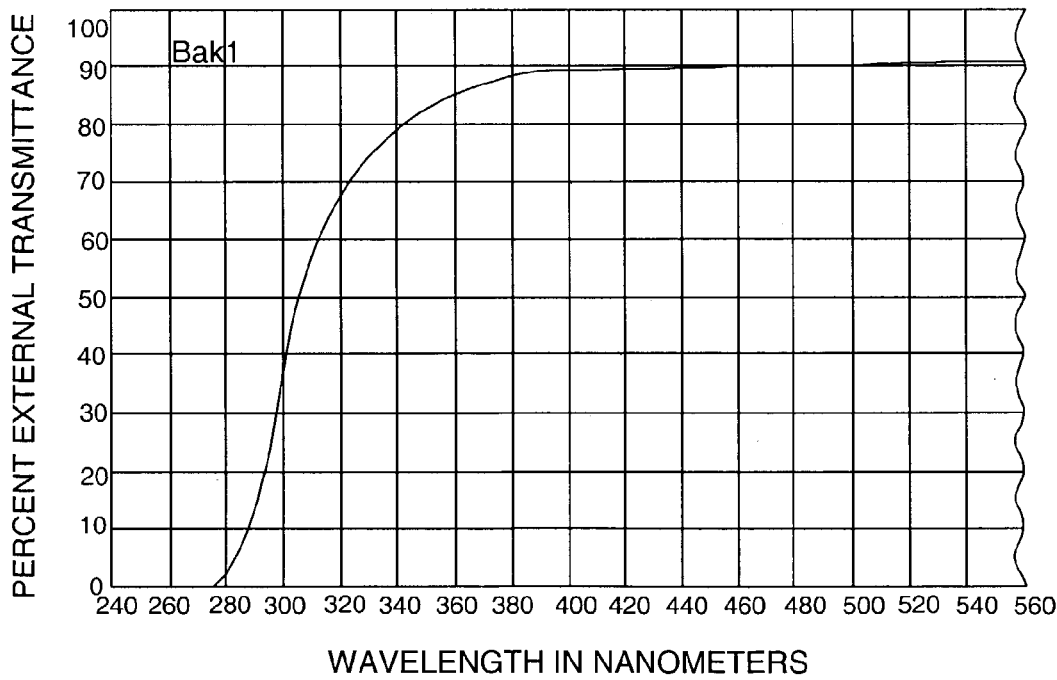
FIG. 10 is a graph showing the relevant properties of BaK1 consistent with this invention.

BaK1—BaK1 is very similar in transmission to BK7 but has somewhat better response in the near ultraviolet. Alkali and phosphate resistance is superior to BK7. FIG. 10 and TABLE 8 provide additional detail about the properties of BaK1.

TABLE 8

| | |
|---|---|
| Index of Refraction (@587.6 nm) | 1.57250 |
| Abbé Factor (v$_d$): | 57.55 |
| Density (gm/cm$^3$) | 3.19 |
| Coefficient of Linear Expansion (−30° to +70°): | $7.6 \times 10^{-6}/°$ C. |
| Coefficient of Linear Expansion (+20° to +300°): | $8.6 \times 10^{-6}/°$ C. |
| Transformation Temperature (° C.): | 592 |
| Young's Modulus (dynes/mm$^2$): | $7.30 \times 10^9$ |
| Climate Resistance: | 2 |
| Stain Resistance: | 1 |
| Acid Resistance: | 3.3 |
| Alkali Resistance: | 1.2 |
| Phosphate Resistance: | 2.0 |
| Knoop Hardness: | 530 |
| Poisson's Ratio: | 0.252 |

Figure 11:
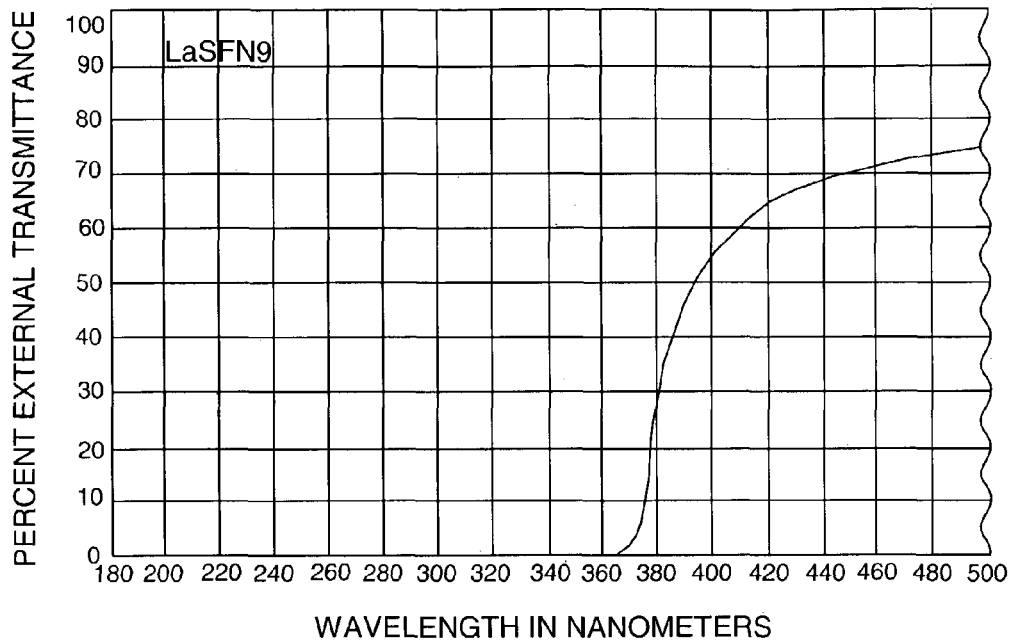
FIG. 11 is a graph showing the relevant properties of LaSFN9 glass consistent with this invention.

LaSFN9—LaSFN9 can be used at higher temperature than many of the other optical glasses. The transmittance is similar to SF11. FIG. 11 and TABLE 9 provides additional detail about the properties of LaSFN9 glass.

TABLE 9

| | |
|---|---|
| Index of Refraction (@587.6 nm): | 1.85025 |
| Abbé Factor (v$_d$): | 32.17 |
| Density (gm/cm$^3$) | 4.44 |
| Coefficient of Linear Expansion (−30° to +70°): | $7.4 \times 10^{-6}/°$ C. |
| Coefficient of Linear Expansion (+20° to +300°): | $8.4 \times 10^{-6}/°$ C. |
| Transformation Temperature (° C.): | 703 |
| Young's Modulus (dynes/mm$^2$): | $1.09 \times 10^{10}$ |
| Climate Resistance: | 2 |
| Stain Resistance: | 0 |
| Acid Resistance: | 2.0 |
| Alkali Resistance: | 1.0 |
| Phosphate Resistance: | 1.0 |
| Knoop Hardness: | 630 |
| Poisson's Ratio: | 0.286 |

Figure 12:
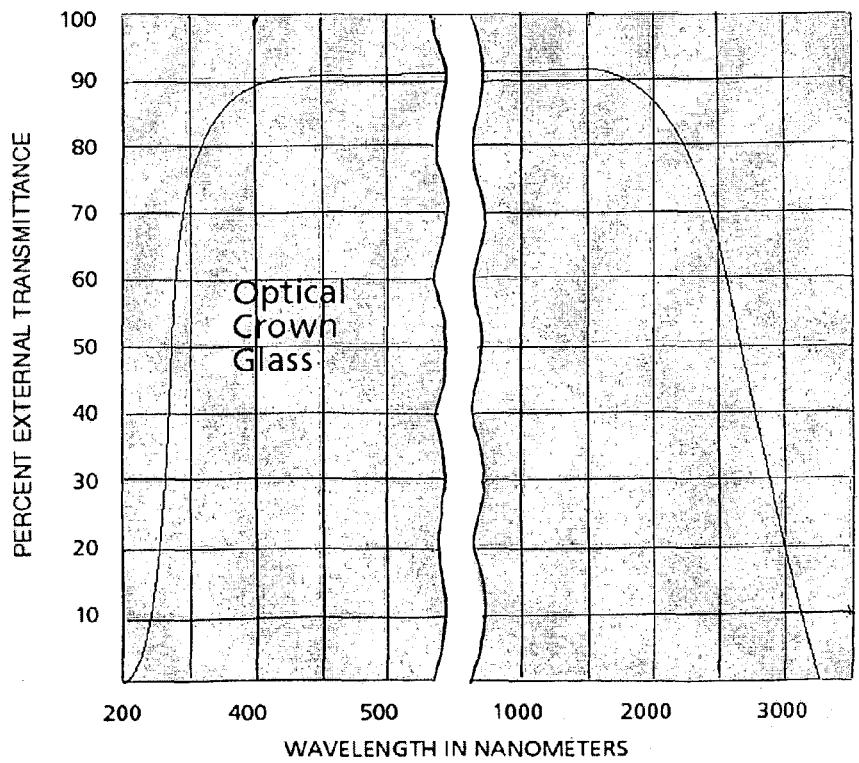
FIG. 12 is a graph showing the relevant properties of optical crown consistent with this invention.

Optical Crown Glass—In optical crown glass, a low-index commercial-grade glass, the index of refraction, transmittance, and homogeneity are not controlled as carefully as they are in optical-grade glasses such as BK7. Optical crown is suitable for applications in which component tolerances are fairly loose and as a substrate material for mirrors. Transmittance characteristics for optical crown are shown in the FIG. below. Relevant properties of optical crown are shown in FIG. 12 and Table 10.

TABLE 10

| | |
|---|---|
| Index of Refraction (@ 587.6 nm): | 1.52288 |
| Dispersion ($n_F$-$n_C$) | 0.0089 |
| Abbé Constant ($v_d$): | 58.5 |
| Density (gm/cm$^3$) at 23° C. | 2.55 |
| Young's Modulus (kN/mm$^2$): | 71.5 |
| Specific Heat (20° to 100° C.) | 0.184 cal/g° C. |
| Coefficient of Linear Expansion (20° to 300°): | 93.3 × 10$^{-7}$/° C. |
| Transformation Temperature (° C.): | 521 |
| Softening Point | 708° C. |

Figure 13:
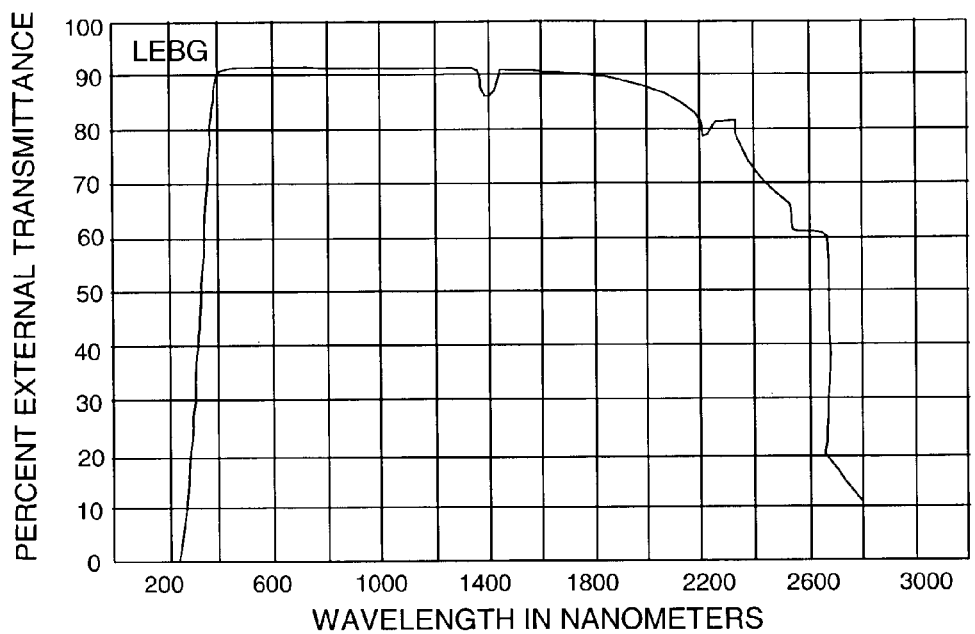
FIG. 13 is a graph showing the relevant properties of Pyrex glass consistent with this invention.

Pyrex glass—A low-expansion borosilicate glass (LEBG) made by Corning is well suited for applications in which high temperature, thermal shock, or resistance to chemical attack are primary considerations. On the other hand, Pyrex is typically less homogeneous and contains more striae and bubbles than optical glasses such as BK7. This material is well suited for application as mirror substrates, condenser lenses for high-power illumination systems, and or windows in high-temperature environments. Relevant properties of Pyrex glass are shown in FIG. 13 and TABLE 11.

TABLE 11

| | |
|---|---|
| Index of Refraction (@546.1 nm): | 1.476 |
| Abbé Factor ($v_d$): | 66 |
| Density (gm/cm$^3$) | 2.23 |
| Coefficient of Linear Expansion (0° to 300°): | 3.25 × 10$^{-6}$/° C. |
| Softening Temperature (° C.): | 820 |
| Melting Temperature (° C.): | 1250 |
| Young's Modulus (dynes/mm$^2$): | 5.98 × 10$^9$ |
| Poisson's Ratio: | 0.20 |

Figure 14:
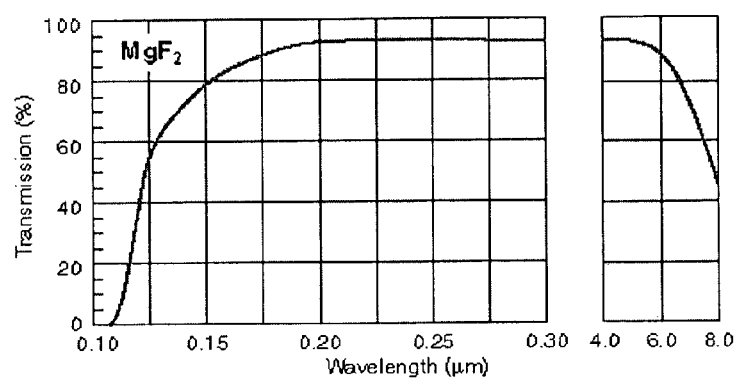
FIG. 14 is a graph showing the relevant properties of magnesium fluoride consistent with this invention.

Magnesium Fluoride—Magnesium Fluoride is a positive birefringent crystal grown using the vacuum Stockbarger technique with good vacuum UV to infrared transmission. It is typically oriented with the c axis parallel to the optical axis to reduce birefringent effects. High vacuum UV transmission down to 150 nm and its proven use in fluorine environments make it ideal for lenses, windows, and polarizers for Excimer lasers. MgF$_2$ is resistant to thermal and mechanical shock. Relevant properties of Magnesium Fluoride are shown in FIG. 14.

Figure 15:
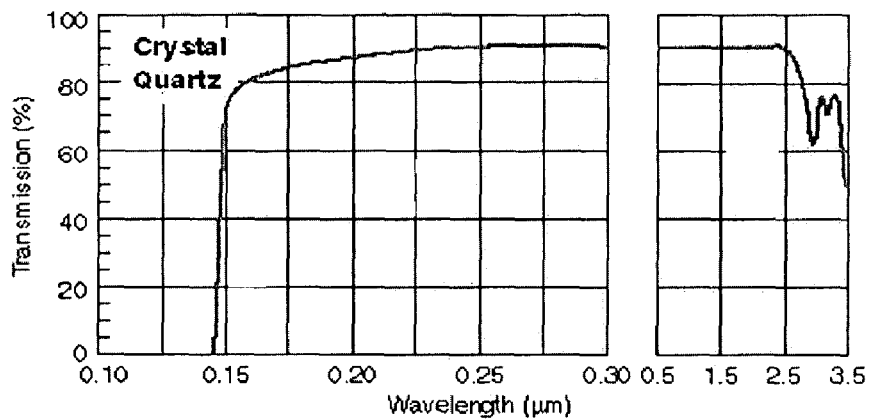
FIG. 15 is a graph showing relevant properties of crystalline quartz consistent with this invention.

Crystal Quartz—Crystal Quartz is a positive uniaxial birefringent single crystal grown using a hydrothermal process. It has good transmission from the vacuum UV to the near infrared. Due to its birefringent nature, crystal quartz is commonly used for waveplates. Relevant properties of Crystal Quartz are shown in FIG. 15.

Additional materials that may be used are described in TABLES 12 and 12A.

TABLE 12

| Material | Refractive Index n | Hardness (Knoop) | Modulus Of Rupture* psi | Transmission Range cm$^{-1}$ (micrometers) | | Chemical Properties |
|---|---|---|---|---|---|---|
| | | | | Windows 1-2 mm | IRE 70 mm | |
| UV Sapphire AL$_2$O$_3$ | 1.75 | 1370 | 65,000 | 66,000-2000 (0.15-5.0) | 33,000-2800 (0.3-3.7) | Very slightly soluble in acids and bases. |
| Strontium Titinate SrTiO$_3$ | 2.41 | 595 | 7500 | 25,000-1700 (0.395-6) | 25,000-2500 (0.4-4) | Readily attacked by HF; resistant to most solvents. |
| Lithium Fluoride LiF | 1.33 | 110 | 2000 | 90,000-1,500 (0.11-7.0) | 50,000-2300 (0.2-4.5) | Slightly soluble in water; soluble in HF. |
| Titanium Dioxide TiO$_2$ | 2.6;2.9 | 800 | 700 | 24,000-1700 (0.42-6) | 20,000-2200 (0.5-4.5) | Soluble in H$_2$SO$_4$ and alkalis; insoluble in water and acid. |
| Zirconium Dioxide ZrO$_2$ | 2.15 | 1250 | 7800 | 27,000-1,500 (0.36-7) | 25,000-1800 (0.4-5.5) | Insoluble in water; soluble in HF and H$_2$SO$_4$. |
| Magnesium Oxide MgO | 1.68 | 640 | 19,000 | 25,000-1300 (0.4-8.0) | 20,000-1700 (0.5-6.0) | Soluble in acids and NH$_4$ salts. |
| Strontium Fluoride SrF$_2$ | 1.44 | 1405 | 500 | 66,000-1000 (0.15-11) | 33,000-1100 (0.3-9.5) | Very slightly soluble in water; soluble in hot HCl. |
| Barium Fluoride BaF$_2$ | 1.45 | 82 | 3900 | 50,000-1000 (0.2-11) | 33,000-1100 (0.3-9.5) | Low water solubility; soluble in acid and NH$_4$Cl. |
| Zinc Sulfide ZnS | 2.22 | 355 | 10,000 | 22,000-750 (0.45-14.0) | 14,000-1000 (0.7-10) | Soluble in acid; insoluble in water. |

TABLE 12-continued

| Material | Refractive Index n | Hardness (Knoop) | Modulus Of Rupture* psi | Transmission Range cm$^{-1}$ (micrometers) | | Chemical Properties |
|---|---|---|---|---|---|---|
| | | | | Windows 1-2 mm | IRE 70 mm | |
| Sodium Chloride NaCl | 1.5 | 15 | 350† | 28,000-700 (0.35-15) | 25,000-900 (0.4-12) | Hygroscopic; slightly soluble in alcohol and NH$_3$. |

TABLE 12A

| Material | Refractive Index n | Hardness (Knoop) | Modulus Of Rupture* psi | Transmission Range cm$^{-1}$ (micrometers) | | Chemical Properties |
|---|---|---|---|---|---|---|
| | | | | Windows 1-2 mm | IRE 70 mm | |
| Zinc Selenide ZnSe | 2.42 | 150 | 8000 | 20,000-500 (0.5-20) | 20,000-700 (0.5-14.3) | Soluble in strong acids; dissolves in HNO$_3$ |
| Potassium Chloride KCl | 1.47 | 7 | 330† | 33,000-500 (0.3-20) | 20,000-700 (0.5-15) | Hygroscopic; water soluble; slightly soluble in alcohol. |
| Silver Chloride AgCl | 2.00 | 10 | 3800† | 23,000-400 (0.42-27) | 22,000-700 (0.45-16) | Insoluble in water; soluble in NH$_4$OH. |
| Potassium Bromide KBr | 1.52 | 7 | 160† | 33,000-400 (0.3-25) | 20,000-500 (0.5-20) | Soluble in water, alcohol, and glycerine; hygroscopic. |
| Silver Bromide AgBr | 2.2 | 10 | 500† | 20,000-300 (0.5-35) | 20,000-500 (0.5-22) | Insoluble in water and alcohol; slightly soluble in NH$_4$OH. |
| Cesium Bromide CsBr | 1.65 | 20 | 1220† | 33,000-250 (0.3-40) | 25,000-400 (0.4-27) | Soluble in water and acids; hygroscopic. |
| Cesium Iodide CsI | 1.72 | 20 | 810 | 33,000-150 (0.3-70) | 20,000-400 (0.5-30) | Soluble in water and alcohol; hygroscopic. |
| Diamond C | 2.4 | 7000 | 54,400 | 45,000-2500; 1600-FIR (0.22-4; 6-FIR) | 45,000-2500; 1600-FIR (6-FIR**) | Insoluble in water, acids, and bases. |

Coatings are applied to plastic optics and glass substrates in much the same way. A physical vapor deposition process is used to apply antireflective, conductive, mirror and beam-splitter coatings. One key difference is that, during the deposition of thin films onto plastic, the coating chamber temperature is significantly lower than that for glass optics.

Antireflection coatings—The most commonly used antireflective coating on plastic is a single layer (¼ thickness) of magnesium fluoride. When applied to a plastic element surface, the average reflectance (450 to 650 nm) can be reduced from about 4 percent to about 1.5 percent. Broadband, multilayer antireflective coatings can provide average surface reflectances of less than 0.5 percent across the visible band; typical broadband coatings comprise three or four layers. Narrowband, multi-layer antireflection coatings can yield surface reflectances less than 0.2 percent.

Dielectric Coatings—In general, any optical coating made from dielectric (non-conducting) materials. Specifically, high-reflection coatings made from a stack of alternate layers of high-and low-refractive-index material, with each layer in the stack having an optical thickness of a quarter wave at the design wavelength.

In a quarter-wave stack, alternate reflections are phase shifted by 180 degrees because they occur at low-to high-index interfaces (external reflections). These phase shifts are exactly canceled by the 180-degree phase shifts caused by the path difference between alternate reflecting surfaces. All reflected wavefronts are therefore exactly in phase and undergo only constructive interference.

If the difference in the refractive index of the materials is large, then a quarter-wave stack containing only a few layers will have a very high reflectance.

Figure 16:
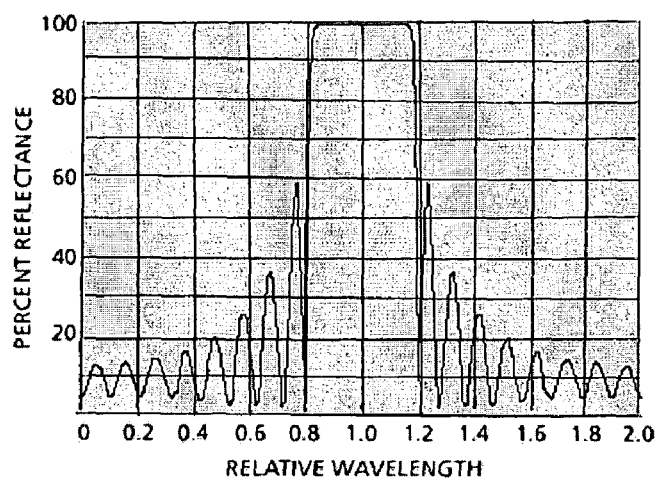
FIG. 16 shows reflection versus wavelength performance curve of a single dielectric stack, consistent with this invention.
Figure 17:
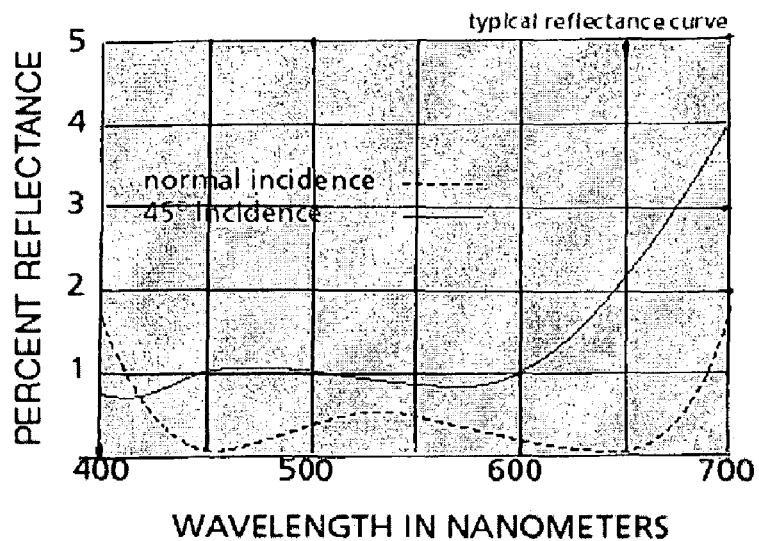
FIG. 17 is a chart showing the transmission characteristics of a visible HEBBAR coating consistent with this invention.

The reflection versus wavelength performance curve of a single dielectric stack has a characteristic flat top inverted V shape as shown in FIG. 16. Clearly, reflectance is a maximum at the wavelength for which both the high-and low-index layers of the multi-layer are exactly one-quarter-wave thick. Outside the fairly narrow region of high reflectance, the reflectance slowly reduces toward zero in an oscillatory fashion. Width and height (i.e., peak reflectance) of the high-reflectance region are functions of the refractive-index ratio of the two materials used, together with the number of layers actually included in the stack. The peak reflectance can be increased by adding more layers, or by using materials with a higher refractive index ratio. Amplitude reflectivity at a single interface is given by $(1-p)/(1+p)$ where $p=(n_H/n_L)^{N-1} \Box n_H^2/n_S$. $n_S$ is the index of the substrate, and $n_H$ and $n_L$ are the indices of the high-and low-index layers. N is the total number of layers in the stack. The width of the high-reflectance part of the curve (versus wavelength) is also determined by the film index ratio. The higher the ratio, the wider is the high-reflectance region. This performance curve is shown in FIG. 17.

High-efficiency broadband antireflection coatings that provide a very low reflectance over a broad spectral bandwidth. These multi-layer films, comprising alternate layers of various index materials, are combined to reduce overall reflectance to an extremely low level for the broad spectral range covered.

Figure 18:
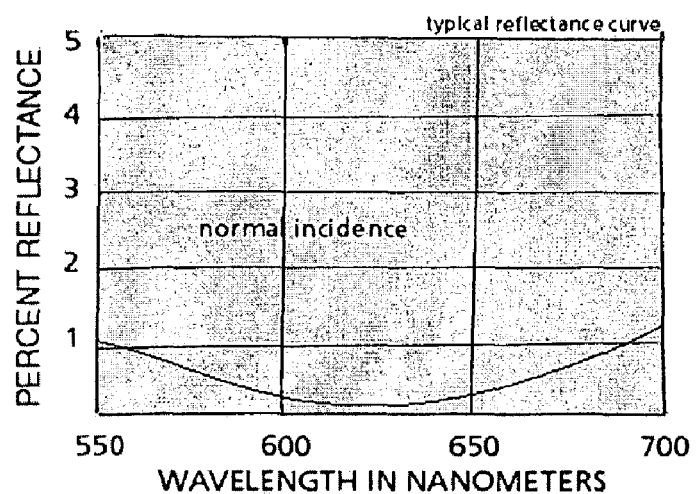
FIG. 18 shows a typical reflectance curve for a V-coating on BK7 optical glass consistent with this invention.

HEBBAR coatings—HEBBAR coatings exhibit a characteristic, double-minimum reflectance curve covering a range of some 300 nm in wavelength. The reflectance does not exceed 1.0% and is more typically below 0.6% over this entire range. Within a more limited spectral range on either side of the central peak, reflectance can be held well below 0.4%. HEBBAR coatings are somewhat insensitive to angle of incidence. The effect of increasing the angle of incidence, however, is to shift the curve to slightly shorter wavelengths and to increase the long wavelength reflectance slightly. These coatings are extremely useful for high-numerical-aperture (low f-number) lenses or steeply curved surfaces. In these cases, incidence angle varies significantly over the aperture. The transmission characteristics of a visible HEBBAR coating are illustrated in FIG. 18.

Laser-Line Coatings—Multilayer dielectric reflective or antireflection (AR) coatings designed for a specific laser wavelength. At other than the design wavelength, the reflecting properties will vary greatly.

V-Coating—V-coatings are multilayer antireflection coatings that reduce the reflectance of a component to near zero for one very specific wavelength. Typically, V-coatings are intended for use at normal incidence, for maximum reflectances of not more than 0.25% at their design wavelength. V-coatings are extremely sensitive to both wavelength and angle of incidence. For example, a V-coating intended for the helium neon wavelength (632.8 nm) when used at 30-degree incidence will reflect about 0.8%. At 45-degree incidence, the same coating will reflect over 2.5%. Experience shows that the maximum reflectance typically achieved by these coatings is often closer to 0.1% than the 0.25%. Using V-coatings on fused-silica optics can therefore provide exceptionally high external transmittances. The typical reflectance curve illustrated in the FIG. 18 is for a V-coating on BK7 optical glass. The coating is designed for a 633-nm helium neon laser.

In one embodiment, a thin-coated data disc is sealed in a hermetic cartridge. The cartridge has one or more windows constructed of high transmissivity short wave or UV materials, with or without enhancement coatings. The windows or windows are so arranged as to provide access to all data bits as the disc is rotated within the cartridge.

In one embodiment, the entire cartridge is constructed of high transmissivity optical material with or without enhancement coatings.

In one embodiment, a partially or fully coated data disc coated data disc is sealed in a hermetic cartridge. The cartridge has one or more windows constructed of high transmissivity short wave or UV materials, with or without enhancement coatings. The windows or windows are so arranged as to provide access to all data bits as the disc is rotated within the cartridge.

In one embodiment, a multiplicity of windows of high transmissivity optical material with or without enhancement coatings are provided to enable simultaneous reads of the same tracks or tracks at different points of the disc, reducing data rotational latency, or enhancing overall data output bandwidth.

In one embodiment, the hermetically sealed protective cartridge has a positive pressurization of 800 torr (or so) of argon, nitrogen, or other inert gasses to reduce in ingress of contaminants.

In one embodiment, the hermetically sealed protective cartridge is designed for use in space with a positive pressurization 7 PSIA of argon, nitrogen, or other inert gasses to reduce in ingress of contaminants. This provides an in atmospheric negative pressuration of 7PSIA in and in space of 7 PSIA outwards.

In one embodiment, the hermetically sealed protective cartridge has a positive pressurization of 800 torr (or so) or argon, nitrogen, or other inert gasses to reduce in ingress of contaminants also utilizes a simplified leak detection system to verify the ongoing integrity of the cartridge.

In yet another embodiment the simplified leak detection mechanism utilizes trace molecules of a compound designed to react and change the color of a visible indicator. The trace molecules are either of a low enough density and size (parts per million) that the data surface of the disc is unimpaired or the molecules are fully or partially optically transparent in the wavelengths of interest.

In one embodiment, hepa filters, other types of filters, or air exchangers are utilized within the data read/write device, such as a DataPlay, CD, or DVD player to reduce dust, air exchange mechanisms.

In one embodiment, hepa filters, other types of filters, or air exchangers are utilized within the data read/write device, such as a DataPlay, CD, or DVD player embedded within a set top box or multimedia home entertainment system to reduce dust, air exchange mechanisms.

In one embodiment, additional memory is present within the read write device to reduce the time period between disc spins and laser diode/electronics power consumption (duty cycle).

In one embodiment, the enhanced data rate and per track data density of a data storage device utilizing a short wave or UV laser diode and/or enhanced linear bit and/or track densities is utilized to reduce the duty cycle of track spins and laser diode/electronics power consumption (duty cycle).

EXAMPLE 1

The increased bit densities from short wave laser diodes are utilized to decrease duty cycle and corresponding power consumption. Assuming the present industry standard circular linear velocity read rate of 3.84 m/sec, the improved bit density from a short wave laser diode provides an increase in output bandwidth to 2.17 megabytes/second, an improvement of 1.57:1. Improved signal to noise also accommodate higher multiples n*X of linear velocity read rates and commensurate increases in output data bandwidth. The increased bandwidth of 2.17 megabyte per second results into a 17 megabit per second data stream, or essentially four times the bandwidth of a high resolution independent video stream. By buffering the overall operational duty cycle may be reduced to 25%. A buffer of 64 megabytes, 512 megabits, affords a buffer time of 2.13 minutes. A buffer of 640 megabytes provides a buffer time of 21.3 minutes. The increased bit densities from UV wave laser diodes may be similarly utilized to further decrease. duty cycle and corresponding laser diode/electronics power consumption. Assuming the present industry standard circular linear velocity read rate of 3.84 m/sec, the improved bit density from a UV laser diode provides an increase in output bandwidth to 4.19 megabytes/second, an improvement of 3.02:1. Improved signal to noise also accommodate higher multiples n*X of linear velocity read rates and commensurate decrease in duty cycle. The bandwidth of eight times the a high resolution video content stream affords a 12.5% duty cycle. Higher spin rates and increased circular linear bits densities have a correspondingly linear reduction of the duty cycle. For lower bandwidth data streams such as compressed audio, the duty cycles are correspondingly less— for example 192 K bit high resolution audio would have a 20× reduction in duty cycles (active duty cycles of better than 1.25% for blue and 0.4% for uv).

In one embodiment, the enhanced data rate and per track data density of a data storage device utilizing a short wave or UV laser diode and/or enhanced linear bit and/or track densities is utilized to increase the output bandwidth of a single disc, thereby providing multiple simultaneous video or other media data streams. This reduces the number of read/write devices utilized in supporting video on demand, cable systems, direct broadcast TV, home entertainment, interactive TV, HDTV, and other forms of in home, to home, last mile, distributed, regional, or head end infrastructures.

In one embodiment, the enhanced data rate and per track data density of a data storage device utilizing a short wave or UV laser diode and/or enhanced linear bit and/or track densities is utilized to increase the output bandwidth of a single disc, thereby providing multiple simultaneous video or other media data streams. A single laser diode may be utilized with a multi-path optical stream with beam steering, piezo actuators, galvos, or other forms of optical steering/multiplexing to essentially eliminate seek times from the multi-content read mechanism. The switching may further be time synchronized with positional rotation to effectively eliminate rotational latency.

EXAMPLE 2

The increased bit densities from short wave laser diodes are utilized to increase output bandwidth. Assuming the present industry standard circular linear velocity read rate of 3.84 m/sec, the improved bit density from a short wave laser diode provides an increase in output bandwidth to 2.17 megabytes/second, an improvement of 1.57:1. Improved signal to noise also accommodate higher multiples n*X of linear velocity read rates and commensurate increases in output data bandwidth. The increased bandwidth of 2.17 megabyte per second results into a 17 megabit per second data stream, or essentially four high resolution independent video streams. Each stream may be partially or fully buffered to allow for seeks to multiple content streams. The increased bit densities from UV wave laser diodes are utilized to increase output bandwidth. Assuming the present industry standard circular linear velocity read rate of 3.84 m/sec, the improved bit density from a UV laser diode provides an increase in output bandwidth to 4.19 megabytes/second, an improvement of 3.02:1. Improved signal to noise also accommodate higher multiples n*X of linear velocity read rates and commensurate increases in output data bandwidth. This essentially provides eight independent high resolution video content streams.

All of the above embodiments are compatible with a plurality of communication networks, not limited to DBS satellite, Cable, Fiber Optic and Internet networks as a distribution method for content, or each can exist in and of themselves as a standalone physical media.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The dimensions of a standard optical disc, as defined by ECMA-267 Standard, 3rd Edition, April 2001, are as follows:

The thickness of the disk, including adhesive layer, spacer(s) and label(s), shall be $$e_1 = 1,20 \text{ mm} \begin{matrix} +0,30 \text{ mm} \\ -0,06 \text{ mm} \end{matrix}$$

The disk shall have an overall diameter $d_1 = 120.00$ mm±0.30 mm

The centre hole of a substrate or a dummy substrate shall have a diameter $$d_2 = 15,00 \text{ mm} \begin{matrix} +0,15 \text{ mm} \\ -0,00 \text{ mm} \end{matrix}$$

What is claimed is:

1. An optically altered optical disc comprising:
a reflective content layer for storing content; and
an additional layer on which the reflective content layer is disposed, wherein said additional layer comprises a material which has a first optical transmissivity associated with light having a wavelength between about 400 nm and about 410 nm and has a second optical transmissivity associated with light having a wavelength of about 635 nm, wherein the first optical transmissivity is greater than the second optical transmissivity.

2. The disc of claim 1, wherein the content layer comprises data representative of content selected from a group consisting of audio information, video information, textual information, and any combination thereof, and wherein the content is in a format selected from a group consisting of analog, digital, and any combination thereof.

3. The disc of claim 1, wherein the reflective content layer comprises an amount of first data recorded in a first format and an amount of second data recorded in a second format.

4. The disc of claim 1, wherein the additional layer comprises a protective coating, disposed on the content layer, having a thickness that is less than 1.24 millimeters.

5. The disc of claim 1, further comprising:
an entrance surface; and
wherein the additional layer comprises an antireflective layer disposed on the entrance surface.

6. The disc of claim 1, wherein the additional layer comprises an ultraviolet light transmissive layer.

7. The disc of claim 6, wherein the ultraviolet light transmissive layer comprises a material selected from a group consisting of silicon dioxide, manganese fluoride, and any combination thereof.

8. The disc of claim 1, wherein the optical disc has an outer diameter that is substantially greater than 120.3 millimeters.

9. The disc of claim 1, wherein the optical disc has an inner diameter less than 15 millimeters.

10. The disc of claim 1, wherein the additional layer comprises a plurality of optically differentiated coatings.

11. The disc of claim 1, wherein the additional layer comprises an inorganic material layer having a band gap greater than about 4.5 eV.

12. The disc of claim 11 wherein the inorganic material layer is selected from a group consisting of an oxide, a nitride, a fluoride, a carbide, and any combination thereof.

13. The disc of claim 12, wherein the substantially transmissive layer is selected from a group consisting of BeO, B2O3, MgO, Al2O3, SiO2, CaO, Cr2O3, GeO2, SrO, Y2O3, ZrO2, BaO2, CeO2 $CeO_2$, HfO2, BN, AN, Si3N4, MgF2, CaF2, SrF2, BaF2, C, SiC, and any combination thereof.

14. The disc of claim 1, wherein the additional layer comprises at least one transmissive layer on a data encoding surface, wherein the transmissive layer is substantially transmissive at a wavelength shorter than 635 nm.

15. The disc of claim 14, wherein the transmissive layer is substantially transmissive at a wavelength shorter than about 520 nm.

16. The disc of claim 14, wherein the transmissive layer is substantially transmissive at a wavelength shorter than about 400 nm.

17. The disc of claim 1, wherein the additional layer comprises an organic layer having a band gap greater than about 3.0 eV.

18. The disc of claim 17, wherein the organic layer is selected from a group consisting of poly(vinyl chloride), poly (methyl methacrylate), perfluorinated form of poly(methyl methacrylate), polystyrene, methyl methacrylate styrene, polycarbonate, cyclic olefin copolymer, and any combination thereof.

19. The disc of claim 1, wherein the additional layer comprises an anti-reflective layer.

20. The disc of claim 19, wherein the anti-reflective layer comprises magnesium fluoride having a thickness that is one-fourth of the wavelength of a light beam used to read the optical disc.

21. The disc of claim 19 wherein the anti-reflective layer comprises a plurality of antireflective layers to form a broadband antireflective coating, wherein the broadband antireflective coating has an average surface reflectance of less than about 0.5 percent across the visible band.

22. The disc of claim 19, wherein the anti-reflective layer comprises a plurality of antireflection coatings to form a narrowband filter coating, wherein the narrowband coating has a surface reflectance of less than about 0.2 percent.

23. The disc of claim 1, wherein the additional layer comprises a dielectric high-reflection layer comprising a stack of alternating layers of high and low refractive-index materials, wherein each of the layers has an optical thickness of about a quarter wavelength at the operating wavelength of a compatible optical disc reader.

24. The disc of claim 1, wherein the additional layer is selected from a HEBBAR coating, a laser-line coating, a v-coating, and any combination thereof.

25. The disc of claim 19, wherein said anti-reflective layer is disposed directly on the reflective content layer.

26. The disc of claim 19, further comprising a substrate between the anti-reflective layer and the reflective content layer.

27. The disc of claim 1, wherein said additional layer comprises a visible light opaque layer.

28. The disc of claim 1, wherein said additional layer comprises an optical filter layer.

29. The disc of claim 1, wherein said additional layer comprises a plurality of optically differentiated layers.

30. A method for forming an optically altered optical disc, the method comprising:
providing a first disc layer, and
disposing a reflective content layer on said first later,
wherein said first disc layer comprises a material which has a first optical transmissivity associated with light having a wavelength between about 400 nm and about 410 nm and has a second optical transmissivity associated with light having a wavelength of about 635 nm, wherein the first optical transmissivity is greater than the second optical transmissivity.

31. The method of claim 30, wherein said first disc layer comprises a protective coating, disposed on the content layer, having a thickness that is less than 1.24 millimeters.

32. The method of claim 30, wherein said first disc layer comprises an anti-reflective layer.

33. The method of claim 30, wherein said first disc layer comprises an ultraviolet light transmissive layer.

34. The method of claim 30, wherein said first disc layer comprises a plurality of optically differentiated coatings.

35. The method of claim 30, wherein said first disc layer comprises an inorganic material layer having a band gap greater than about 4.5 eV.

36. The method of claim 30, wherein said first disc layer comprises an organic layer having a band gap greater than about 3.0 eV.

37. The method of claim 30, wherein said first disc layer comprises a visible light opaque layer.

38. The method of claim 30, wherein said first disc layer comprises an optical filter layer.

39. The method of claim 30, wherein said first disc layer comprises a plurality of optically differentiated layers.

40. An optically altered optical disc, comprising:
a means for storing content; and
a means for coating comprising a material which has a first optical transmissivity associated with light having a wavelength between about 400 nm and about 410 nm and has a second optical transmissivity associated with light having a wavelength of about 635 nm, wherein the first optical transmissivity is greater than the second optical transmissivity;
wherein said means for storing content is disposed on said means for coating.

41. The disc of claim 40, wherein the means for coating comprises an organic layer having a band gap greater than about 3.0 eV.

* * * * *

UNITED STATES PATENT AND TRADEMARK OFFICE
CERTIFICATE OF CORRECTION

| | |
|---|---|
| PATENT NO. | : 7,960,005 B2 |
| APPLICATION NO. | : 10/243826 |
| DATED | : June 14, 2011 |
| INVENTOR(S) | : Hunter et al. |

It is certified that error appears in the above-identified patent and that said Letters Patent is hereby corrected as shown below:

Title page, item (75), under "Inventor", in Column 1, Line 2, delete "Bernard L" and insert -- Bernard L. --.

Page 4, item (56), under "Other Publications", in Column 2, Line 8, delete "contentkep." and insert -- contentkey. --.

Page 5, item (56), under "Other Publications", in Column 2, Line 3, delete "regenertively" and insert -- regeneratively --.

Column 36, line 54, in Claim 5, delete "antireflective" and insert -- anti-reflective --.

Column 37, lines 8-11, in Claim 13, delete "BeO, B2O3, MgO, Al2O3, SiO2, CaO, Cr2O3, GeO2, SrO, Y2O3, ZrO2, BaO2, CeO2 CeO$_2$, HfO2, BN, AN, Si3N4, MgF2, CaF2, SrF2, BaF2, C, SiC," and insert -- BeO, $B_2O_3$, MgO, $Al_2O_3$, $SiO_2$, CaO, $Cr_2O_3$, $GeO_2$, SrO, $Y_2O_3$, $ZrO_2$, $BaO_2$, $CeO_2$, $HfO_2$, BN, AlN, $Si_3N_4$, $MgF_2$, $CaF_2$, $SrF_2$, $BaF_2$, C, SiC, --.

Column 37, line 37, in Claim 21, delete "claim 19" and insert -- claim 19,--.

Column 37, lines 38-40, in Claim 21, delete "antireflective layers to form a broadband antireflective coating, wherein the broadband antireflective coating" and insert -- anti-reflective layers to form a broadband anti-reflective coating, wherein the broadband anti-reflective coating --.

Column 38, line 13, in Claim 30, delete "later," and insert -- layer, --.

Signed and Sealed this
Seventeenth Day of January, 2012

David J. Kappos
*Director of the United States Patent and Trademark Office*